(12) United States Patent
Hong et al.

(10) Patent No.: US 12,229,392 B2
(45) Date of Patent: Feb. 18, 2025

(54) ELECTRONIC DEVICE AND METHOD FOR CONFIGURING SCREEN OF DISPLAY IN ELECTRONIC DEVICE

(71) Applicant: SAMSUNG ELECTRONICS CO., LTD., Suwon-si (KR)

(72) Inventors: Yujung Hong, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/885,260

(22) Filed: Aug. 10, 2022

(65) Prior Publication Data

US 2023/0045834 A1    Feb. 16, 2023

Related U.S. Application Data

(63) Continuation of application No. PCT/KR2022/011735, filed on Aug. 8, 2022.

(30) Foreign Application Priority Data

Aug. 10, 2021  (KR) .................. 10-2021-0105206
Aug. 24, 2021  (KR) .................. 10-2021-0111381

(51) Int. Cl.
*G06F 3/04845*  (2022.01)
*G06F 1/16*     (2006.01)
*G06F 3/0482*   (2013.01)

(52) U.S. Cl.
CPC ........ *G06F 3/04845* (2013.01); *G06F 1/1652* (2013.01); *G06F 3/0482* (2013.01)

(58) Field of Classification Search
CPC ... G06F 3/04845; G06F 1/1652; G06F 3/0482
See application file for complete search history.

(56) References Cited

U.S. PATENT DOCUMENTS 11,112,826 B2 *  9/2021  Ko .................. G06F 3/04817
11,164,544 B2 * 11/2021  Yun ................. G06F 1/1654
(Continued)

FOREIGN PATENT DOCUMENTS

KR          10-0827228 B1      5/2008
KR       10-2009-0030138 A     3/2009
(Continued)

OTHER PUBLICATIONS

International Search Report dated Nov. 2, 2022, issued by the International Searching Authority in International Application No. PCT/KR2022/011735 (PCT/ISA/210).
(Continued)

*Primary Examiner* — Beau D Spratt
(74) *Attorney, Agent, or Firm* — Sughrue Mion, PLLC

(57) ABSTRACT

According to various embodiments, an electronic device may include a flexible display; and a processor configured to: identify screen size information about the flexible display, control the flexible display to operate the flexible display in a first state of displaying an activated menu window and an activated content window, based on the screen size information indicating a first screen size of the flexible display, and control the flexible display to operate the flexible display in a second state of displaying the
(Continued)

activated menu window and a plurality of activated content windows, based on the screen size information indicating a second screen size of the flexible display.

12 Claims, 31 Drawing Sheets

(56) References Cited

U.S. PATENT DOCUMENTS

| | | |
|---|---|---|
| 2007/0252822 A1 | 11/2007 | Kim et al. |
| 2011/0164058 A1 | 7/2011 | Lemay |
| 2012/0139945 A1 | 6/2012 | Choi |
| 2013/0238724 A1 | 9/2013 | Cunningham |
| 2016/0349971 A1* | 12/2016 | Chi .................... G09G 5/373 |
| 2017/0011714 A1* | 1/2017 | Eim .................... G06F 1/1677 |
| 2017/0061932 A1* | 3/2017 | Kwon ................. G06F 1/1626 |
| 2017/0102872 A1 | 4/2017 | Kim et al. |
| 2017/0103735 A1* | 4/2017 | Oh ..................... G06F 1/1626 |
| 2017/0147189 A1* | 5/2017 | Ryu ................... G06F 3/04886 |
| 2018/0348881 A1* | 12/2018 | Chung ................. H04W 88/02 |
| 2018/0373408 A1 | 12/2018 | Lee |
| 2021/0350767 A1* | 11/2021 | Lee .................... G06F 3/04886 |
| 2022/0035513 A1* | 2/2022 | Kang ................... G06F 3/0481 |
| 2022/0057919 A1* | 2/2022 | Noh .................... G06F 1/1652 |
| 2022/0291723 A1* | 9/2022 | Otomasu .............. G06F 1/1677 |
| 2023/0040472 A1* | 2/2023 | Kim .................. H04N 21/42204 |

FOREIGN PATENT DOCUMENTS

| | | |
|---|---|---|
| KR | 10-2012-0059790 A | 6/2012 |
| KR | 10-2012-0104626 A | 9/2012 |
| KR | 10-2015-0053650 A | 5/2015 |
| KR | 10-2017-0043065 A | 4/2017 |
| KR | 10-2019-0001388 A | 1/2019 |
| KR | 10-2020-0014878 A | 2/2020 |
| WO | 2021/132757 A1 | 7/2021 |

OTHER PUBLICATIONS

Written Opinion dated Nov. 2, 2022, issued by the International Searching Authority in International Application No. PCT/KR2022/011735 (PCT/ISA/237).

* cited by examiner

ELECTRONIC DEVICE AND METHOD FOR CONFIGURING SCREEN OF DISPLAY IN ELECTRONIC DEVICE

CROSS-REFERENCE TO RELATED APPLICATIONS

This application is a bypass continuation application of International Application No. PCT/KR2022/011735, filed on Aug. 8, 2022, which is based on and claims the benefit of Korean Patent Application No. 10-2021-0105206, filed on Aug. 10, 2021, in the Korean Intellectual Property Office, and Korean Patent Application No. 10-2021-0111381, filed on Aug. 24, 2021, in the Korean Intellectual Property Office, the disclosures of which are incorporated by reference herein in their entireties.

BACKGROUND

1. Field

The disclosure relates to an electronic device and a method for configuring a screen of a display in the electronic device, and more particularly, to arrangement and sizing of menu and content windows on a display which can be configured in a plurality of screen sizes.

2. Description of Related Art

More and more services and additional functions are being provided through electronic devices, e.g., smartphones, or other portable electronic devices. To meet the needs of various users and improve the use efficiency of electronic devices, communication service carriers or device manufacturers are in competition to develop electronic devices with differentiated and diversified functionalities. Accordingly, various functions that are provided through electronic devices are evolving more and more.

Further, the electronic device provides various GUIs for interaction with the user through the display.

An electronic device may be equipped with a fixed-form display or a foldable or bendable or rollable display (or an electronic device equipped with such display) considering the portability of the electronic device.

However, since the GUI provided by the electronic device is for a fixed-type display, such GUI does not consider a foldable or bendable or rollable-type display whose screen size may be changed.

SUMMARY

Provided is an electronic device and a method for configuring a screen of a display in the electronic device.

Additional aspects will be set forth in part in the description which follows and, in part, will be apparent from the description, or may be learned by practice of the presented embodiments In accordance with an aspect of the disclosure, an electronic device includes: a flexible display; and a processor configured to: identify screen size information about the flexible display, control the flexible display to operate the flexible display in a first state of displaying an activated menu window and an activated content window, based on the screen size information indicating a first screen size of the flexible display, and control the flexible display to operate the flexible display in a second state of displaying the activated menu window and a plurality of activated content windows, based on the screen size information indicating a second screen size of the flexible display.

In accordance with an aspect of the disclosure, a method for configuring a screen of a flexible display of an electronic device, the method including: identifying screen size information about the flexible display; operating the flexible display in a first state of displaying an activated menu window and an activated content window on the display, based on the screen size information indicating a first screen size of the flexible display; and operating the flexible display in a second state of displaying the activated menu window and a plurality of activated content windows on the display, based on the screen size information indicating a second screen size of the flexible display.

According to various embodiments, as the screen of the display is configured based on the screen size of the display in the electronic device, an optimal GUI interactable with the user may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
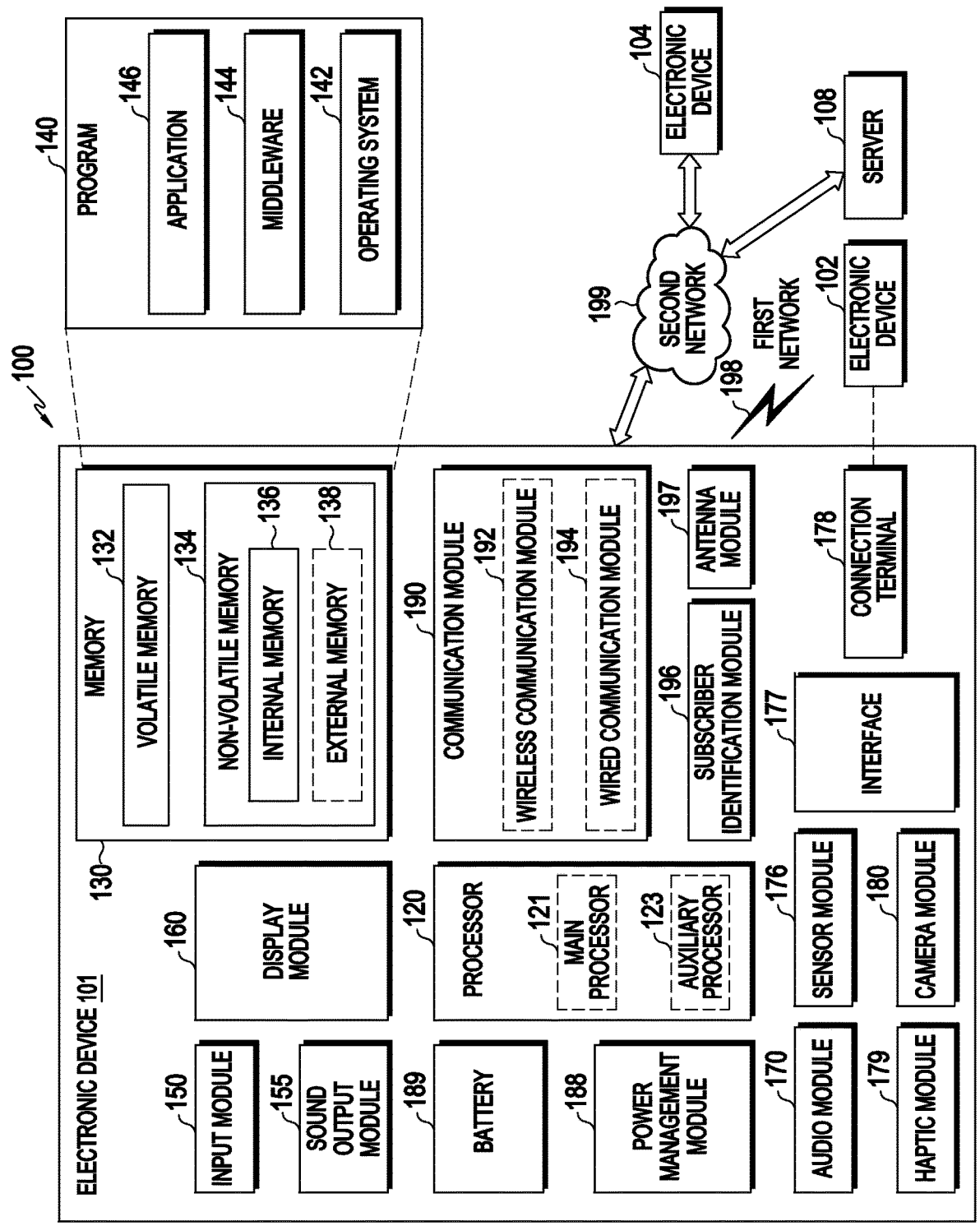
FIG. 1 is a view illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
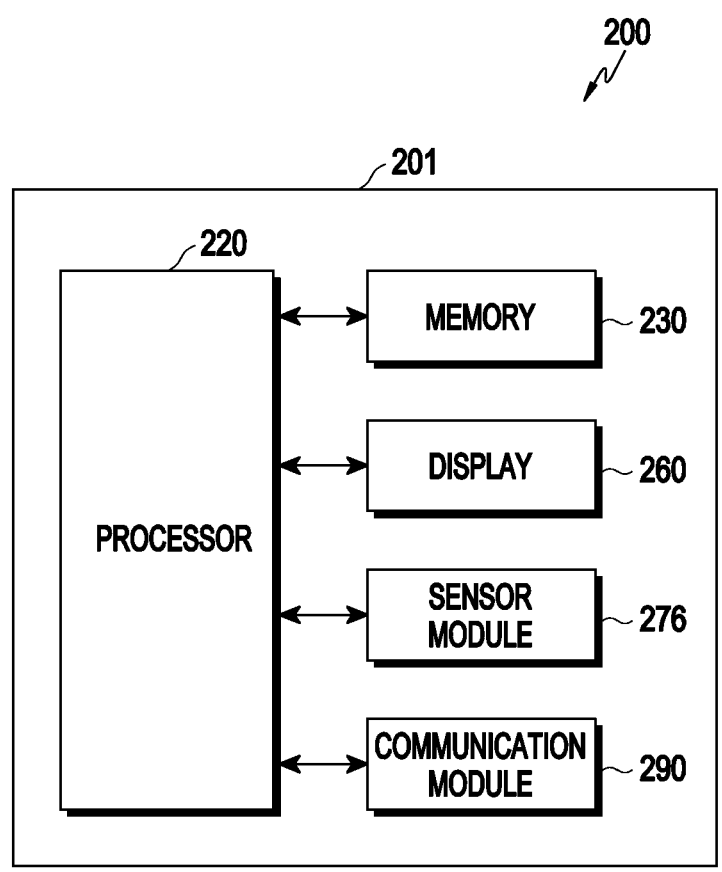
FIG. 2 is a block diagram illustrating an electronic device, according to various embodiments.

FIG. 2 is a block diagram 200 illustrating an electronic device according to various embodiments.

Referring to FIG. 2, an electronic device 201 (e.g., the electronic device 101 of FIG. 1) may include a processor 220, a memory 230, a display 260, a sensor module 276, and a communication module 290.

According to various embodiments, the processor 220 (e.g., the processor 120 of FIG. 1) may identify screen size information about the display according to a change in the screen size of the display 260.

According to various embodiments, the display 260 is flexible; it can be configured into a plurality of screen size configurations. There are various suitable designs for achieving a flexible display, some of which will be elaborated on further herein without limitation.

According to an embodiment, the processor 220 may identify the screen size information about the display using sensor information received from the sensor module 276, which is configured to detect a change in the screen size of the flexible display 260.

For example, when the electronic device 201 includes a flexible display in which the area of the display may be divided, by folding on a hinge configured to connect at least two housings on which the display may be provided, the processor 220 may identify the screen size information about the display using the sensor information from the sensor module 276, which is configured to detect the folding or unfolding on the hinge. In an embodiment where the electronic device 201 includes an in-foldable hinge configured to connect two housings, the flexible display in the unfolded state may fold inward as the in-foldable hinge folds, so that the display areas may be divided. When the electronic device includes an out-foldable hinge configured to connect two housings, the flexible display in the unfolded state may fold outward as the out-foldable hinge folds, so that the display areas may be divided. The electronic device 201 may include one hinge (e.g., an in-foldable hinge or an unfoldable hinge) configured to connect a plurality of housings, or a plurality of hinges, any of which may be an in-foldable hinge or an out-foldable hinge.

As another example, when the electronic device 201 includes a rollable-type flexible display configured to be drawn into and out of the housing of the electronic device, the processor 220 may identify the screen size information about the display using the sensor information from the sensor module 276, which is configured to detect an amount of the display being drawn out and exposed from the housing of the electronic device.

As yet another example, when the electronic device 201 includes a flexible display including a first area, which is always exposed from the housing of the electronic device, and a second area, which may be exposed to the outside of the housing or inserted into the interior of the housing and which extends from the first area, the processor 220 may identify the screen size information about the display using the sensor information from the sensor module 276 which is configured to detect the exposure of the second area to the outside of the housing or the insertion of the second area into the inside of the housing.

According to an embodiment, the processor 220 may identify the landscape mode of the electronic device or the portrait mode of the electronic device using the sensor information from the sensor module 276 which is configured to detect the rotation of the electronic device 201 and identify the screen size information about the display according to whether the electronic device is in the landscape mode or portrait mode.

According to various embodiments, the processor 220 (e.g., the processor 120 of FIG. 1) may determine that particular categories of information are included in the screen size information.

According to various embodiments, upon identifying that the screen size information (e.g., width information or height information about the display) about the display includes first or reduced screen size information, the processor 220 (e.g., the processor 120 of FIG. 1) may selectively switch to a first state of display operation, which is a reduced size state. The first state displays a menu window for providing an activated menu and a content window for providing activated content on the display 260.

According to an embodiment, the first or reduced screen size information may be defined as screen size information indicating a screen size between 600 dp and 959 dp.

According to an embodiment, the menu window may have at least two configurations: a basic menu window and an extended menu window, each configured for providing the menu. The basic menu window may be fitted within an area having a first size, and the extended menu window may be fitted within an area having a second size larger than the basic menu window.

The area with the first size, which the basic menu window is displayed within on the display, and the area with the second size, which the extended menu window is displayed within, may be predefined or set in the electronic device. It is also noted that the various windows may alternatively be thought of as defining, or fitted to, their respective areas.

The basic menu window may provide at least one selectable menu. The extended menu window may provide the selectable menu provided in the basic menu window and information about the selectable menu. The extended menu window may provide the selectable menu provided in the basic menu window and at least one selectable sub-menu included in the selectable menu. At least one content element may be displayed in the content window, and the content element may be selected by the user.

Therefore, when the processor is in the first state, it may display either the basic menu window and the content window, or the extended menu window and the content window; that is, the menu window in its activated configuration and the content window.

According to an embodiment, upon identifying a display setting of the menu window (e.g., a set default state of the menu window) for the first state as the basic menu window, the processor 220 may display the basic menu window within an area having a first size on the display 260, and display the content window within an area not overlapping the basic menu window.

Under this setting, during display of the basic menu window and the content window on the display 260, if the processor 220 determines that the extended menu window has been selected for display, the processor 220 may display the extended menu window within an area having a second size larger than the first size, and the content window within an area not overlapping the extended menu window and based on the size of the extended menu window. As the extended menu window and the area with the second size are respectively larger than the basic menu window and the area having the first size, the area not overlapping the extended menu window is expected to be smaller than the area not overlapping the basic menu window, and if so, the content window and the content elements within may be reduced in size to fit within this area. As the processor 220 reduces the size of the content elements displayed in the content window to correspond to the resizing of the content window, it is possible to display all content elements in the content window. The selection of the extended menu window for display may be by selection of an icon designated for this purpose and included in the basic menu window, or by a first gesture designated for this purpose (e.g., a first drag from the left to right).

Under this setting, during display of the extended menu window and the content window on the display 260, if the processor 220 determines that the basic menu window has been selected for display, the processor 220 may display the basic menu window within the area with the first size, and the content window within an area not overlapping the basic menu window and based on the size of the basic menu window. As the basic menu window and the area with the first size are respectively larger than the extended menu window and the area with the second size, the area not overlapping the basic menu window is expected to be larger than the area not overlapping the extended menu window, and if so, the content window and the content elements within may be increased in size to make full use of this entire area. As the processor 220 increases the size of the content elements displayed in the content window to correspond to the resizing of the content window, it remains possible to display all content elements in the content window. The selection of the basic menu window for display may be by selection of an icon designated for this purpose and included in the extended menu window, or by a second gesture designated for this purpose (e.g., a second drag from the right to left).

According to an embodiment, upon identifying a display setting of the menu window (e.g., a set default state of the menu window) for the first state as the extended menu window, the processor 220 may display the extended menu window within the area having the second size on the display 260 and display the content window within an area not overlapping the extended menu window.

Under this setting, during display of the extended menu window and the content window on the display 260, if the processor 220 determines that the basic menu window has been selected for display, the processor 220 may display the basic menu window within the area having the first size, and the content window within the area not overlapping the basic menu window and based on the size of the basic menu window. As the basic menu window and the area with the first size are respectively smaller than the extended menu window and the area having the second size, the area not overlapping the basic menu window is expected to be larger than the area not overlapping the extended menu window, and if so, the content window and the content elements within may be increased in size to make full use of this entire area. As the processor 220 increases the size of the content elements displayed in the content window to correspond to the resizing of the content window, it remains possible to display all content elements in the content window. The selection of the basic menu window for display may be by selection of an icon designated for this purpose and included in the extended menu window, or by a second gesture designated for this purpose (e.g., a second drag from the right to left).

Under this setting, during display of the basic menu window and the content window on the display 260, if the processor 220 determines that the extended menu window has been selected for display, the processor 220 may display the extended menu window within the area having the second size, and the content window within an area not overlapping the extended menu window and based on the size of the extended menu window. As the extended menu window and the area having the second size are respectively larger than the basic menu window and the area having the first size, the area not overlapping the extended menu window is expected to be smaller than the area not overlapping the basic menu window, and if so, the content window and the content elements within may be reduced in size to fit within this area. As the processor 220 reduces the size of the content elements displayed in the content window to correspond to the resizing of the content window, it remains possible to display all content elements in the content window. The selection of the extended menu window for display may be by selection of an icon designated for this purpose and included in the basic menu window, or by a first gesture designated for this purpose (e.g., a first drag from the left to right).

According to various embodiments, upon identifying that the screen size information (e.g., width information or height information about the display) about the display includes second screen size information, the processor 220 (e.g., the processor 120 of FIG. 1) may selectively switch to a second state of display operation, which is an enlarged size state. The second state displays a menu window for providing an activated menu and a plurality of content windows for providing activated content on the display 260.

According to an embodiment, the second or enlarged screen size information may be defined as screen size information indicating a screen size of 960 dp or more.

According to an embodiment, the menu window may have at least two configurations: a basic menu window and an extended menu window, each configured for providing the menu. The basic menu window may be fitted within an area having a first size, and the extended menu window may be fitted within an area having a second size larger than the basic menu window.

The basic menu window may provide at least one selectable menu. The extended menu window may provide the selectable menu provided in the basic menu window and information about the selectable menu. The extended menu window may provide the selectable menu provided in the basic menu window and at least one selectable sub-menu included in the selectable menu. At least one content element may be displayed in each of the plurality of content windows, and the content element may be selected by the user. More specifically, in certain embodiments, at least one content element may be displayed in a first content window among the plurality of content windows, and at least one content sub-element corresponding to a content element selected from the first content window may be displayed in a second content window among the plurality of content windows.

Therefore, when the processor is in the second state, it may display either the basic menu window and the plurality of content windows, or the extended menu window and the plurality of content windows; that is, the menu window in its activated configuration and the plurality of content windows.

According to an embodiment, upon identifying a display setting of the menu window (e.g., a set default state of the menu window) for the second state as the basic menu window, the processor 220 may display the basic menu window within the area having the first size on the display 260, and display the plurality of content windows within an area not overlapping the basic menu window.

Under this setting, during display of the basic menu window and the plurality of content windows on the display 260, if the processor 220 determines that the extended menu window has been selected for display, the processor 220 may display the extended menu window within the area having the second size, and the plurality of content windows within respective areas not overlapping the extended menu window and based on the size of the extended menu window. As the extended menu window and the area having the second size are respectively larger than the basic menu window and the area having the first size, the area not overlapping the extended menu window is expected to be smaller than the area not overlapping the basic menu window, and if so, the content window and the content elements within may be reduced in size to respectively fit within this area. As the processor 220 reduces the size of the content elements displayed in each of the plurality of content windows to correspond to the resizing of the plurality of content windows, it remains possible to display all content elements in each of the plurality of content windows. The selection of the extended menu window for display may be by selection of an icon designated for this purpose and included in the basic menu window, or by a first gesture designated for this purpose (e.g., a first drag from the left to right).

Under this setting, during display of the extended menu window and the plurality of content windows on the display 260, if the processor 220 determines that the basic menu window has been selected for display, the processor 220 may display the basic menu window within the area having the first size, and the plurality of content windows each within an enlarged area not overlapping the basic menu window and based on the size of the basic menu window. As the basic menu window and the area having the first size are respectively smaller than the extended menu window and the area having the second size, the area not overlapping the basic menu window is expected to be larger than the area not overlapping the extended menu window, and if so, the content window and the content elements within may be increased in size to make full use of this entire area. As the processor 220 increases the size of the content elements displayed in each of the plurality of content windows to correspond to the resizing of the plurality of content windows, it remains possible to display all content elements in each of the plurality of content windows. The selection of the basic menu window for display may be by selection of an icon designated for this purpose and included in the extended menu window, or by a second gesture designated for this purpose (e.g., a second drag from the right to left).

According to an embodiment, upon identifying a setting of the menu window (e.g., a set default state of the menu window) for the second state as the extended menu window, the processor 220 may display the extended menu window within the area with the second size on the display 260 and display the plurality of content windows within an area not overlapping the extended menu window.

Under this setting, during display of the extended menu window and the plurality of content windows on the display 260, if the processor 220 determines that the basic menu window has been selected for display, the processor 220 may display the basic menu window within the area having the first size, and the plurality of content windows within the area not overlapping the basic menu window and based on the size of the basic menu window. As the basic menu window and the area having the first size are respectively smaller than the extended menu window and the area having the second size, the area not overlapping the basic menu window is expected to be larger than the area not overlapping the extended menu window, and if so, the content window and the content elements within may be increased in size to make full use of this entire area. As the processor 220 increases the size of the content elements displayed in each of the plurality of content windows to correspond to the resizing of the plurality of content windows, it remains possible to display all content elements in each of the plurality of content windows. The selection of the basic menu window for display may be by selection of an icon designated for this purpose and included in the extended menu window, or by a second gesture designated for this purpose (e.g., a second drag from the right to left).

Under this setting, during display of the basic menu window and the plurality of content windows on the display 260, if the processor 220 determines that the extended menu window has been selected for display, the processor 220 may display the extended menu window within the area with the second size, and the plurality of content windows within an area not overlapping the extended menu window and based on the size of the extended menu window. As the extended menu window and the area with the second size are respectively larger than the basic menu window and the area with the first size, the area not overlapping the extended menu window is expected to be smaller than the area not overlapping the basic menu window, and if so, the content window and the content elements within may be reduced in size to fit within this area. As the processor 220 reduces the size of the content elements displayed in each of the plurality of content windows to correspond to the resizing of the plurality of content windows, it remains possible to display all content in each of the plurality of content windows. The selection of the extended menu window for display may be by selection of an icon designated for this purpose and included in the basic menu window, or by a first gesture designated for this purpose (e.g., a first drag from the left to right).

According to various embodiments, upon failing to identify the screen size information (e.g., width information or height information about the display) about the display 260 as either of the first screen size information and the second screen size information, the processor 220 (e.g., the processor 120 of FIG. 1) may display an icon designated for selecting display of the extended menu window in a predetermined area of the display 260.

According to an embodiment, upon identifying the screen size information (e.g., width information or height information about the display) about the display as screen size information smaller than the first screen size information (e.g., indicating a screen size of 600 dp or less), the processor 220 may display an icon designated for selecting display of the extended menu window in a predetermined area (e.g., an upper area) of the display 260 and, upon identifying selection of the icon, display the activated extended menu window and an inactivated content area on the display 260.

According to various embodiments, upon detecting a first gesture (e.g., event) (e.g., a first drag from the left to right) designated for selecting display of the extended menu window, the gesture being within the basic menu window (dynamic drag area), while the processor 220 is in either of the first state and the second state, the processor 220 (e.g., the processor 120 of FIG. 1) may display the extended menu window within the area with the second size, calculate the enlarged size (e.g., dx distance) from the basic menu window to the extended menu window, and store the calculated size value (e.g., dx distance value). The processor 220 may calculate the adjusted screen size (e.g., width or height information) of the content window or the plurality of content windows based on the stored size value (e.g., dx distance value) and resize and display the content window or the plurality of content windows.

According to various embodiments, in either of the first state and the second state, the basic menu window may be disposed in the left area of the display 260, and the content window or the plurality of content windows may be disposed in the right area of the display 260. This arrangement will be assumed hereinafter for convenience, but it is noted that other arrangements are possible and within the scope of the invention, including but not limited to the menu window to the right and the content window(s) to the left, the menu window above and the content window(s) below, and the menu window below and the content window(s) above. Those of skill in the art will be able to apply the disclosures within to such arrangements.

According to an embodiment, upon identifying selection of display of the extended menu window based on detection of the first gesture (e.g., the first drag from the left to right) while displaying the basic menu window, disposed in an left area of the display in either of the first state and the second state, the processor 220 may display the extended menu window within an area with the second size, enlarged rightward from the basic menu window.

According to an embodiment, if the basic menu window is enlarged rightward, based on detection of the first gesture while displaying the basic menu window disposed in the left area of the display in either of the first state and the second state, the processor 220 may provide a process of switching into the extended menu window within the area with the second size, as an animation (e.g., snap animation).

According to various embodiments, the processor 220 (e.g., the processor 120 of FIG. 1) may set a predetermined area (e.g., 12 dp), which is added on the left of the display, as an available area for the menu window in either the first state of displaying the activated menu window (e.g., the basic menu window or the extended menu window) and the activated content window, or the second state of displaying the activated menu window (e.g., the basic menu window or the extended menu window) and the plurality of activated content windows. The processor may detect a first gesture (e.g., the first drag from the left to right) designated to activate display of the extended menu window and/or a second gesture (e.g., the second drag from the right to left) designated to activate display of the basic menu window in the available area for the menu window. The processor 220 may identify an area (e.g., 12 dp) selected by the user in the settings or elsewhere as the predetermined area.

According to various embodiments, the processor 220 may set the area for the basic menu window to the predetermined area (e.g., 12 dp), which is added to the left of the display, as an available area for the basic menu window when placing and displaying the basic menu window in the left area of the display 260, in either of the first state and the second state, and may detect the first gesture (e.g., the first drag from the left to right) for displaying the extended menu window in the available area for the basic menu window.

According to various embodiments, the processor 220 may set the area for the extended menu window to the predetermined area (e.g., 12 dp), which is added to the left of the display, as an available area for the extended menu window when placing and displaying the extended menu window in the left area of the display 260, in either of the first state and the second state, and may detect the second gesture (e.g., the second drag from the right to left) for displaying the basic menu window in the available area for the extended menu window.

According to various embodiments, the processor 220 (e.g., the processor 120 of FIG. 1) may configure a menu panel (drawer panel) for displaying the menu window (e.g., the basic menu window or the extended menu window) and a content panel (slide panel) for displaying the content window or the plurality of content windows, in either of the first state and the second state.

According to an embodiment, the processor 220 may provide the basic menu window or extended menu window on the menu panel for displaying the menu window, in either of the first state and the second state, and may dispose the menu panel in the left or right area of the display 260.

According to an embodiment, the menu panel (drawer panel) may include a close state of displaying the basic menu window within the area with the first size, an open state of displaying the extended menu window within the area with the second size enlarged as compared with the basic menu window, and an idle state of switching from the close state of displaying the basic menu window to the open state of displaying the extended menu window.

According to an embodiment, the content panel (slide panel) may include the remaining area except for the menu panel (drawer panel) in the display 260 and may display at least one content window which may be resized depending on the size of the extended menu window or the size of the basic menu window.

According to various embodiments, the processor 220 (e.g., the processor 120 of FIG. 1) may recognize the gesture detected from the menu window as an operation of the menu window but not recognize it as an operation in the content window, and may recognize a gesture detected from the content window as an operation in the content window but not recognize it as an operation in the menu window, in either of the first state and the second state.

According to an embodiment, the processor 220 may provide a partial area (e.g., an upper area) of the content window as an application bar area capable of displaying information about the currently running application, in either of the first state and the second state, and, if an event or information related to the application is updated, resize the application bar area.

According to various embodiments, the processor 220 (e.g., the processor 120 of FIG. 1) may provide a scroll function to the menu window, in either of the first state and the second state.

According to an embodiment, upon detecting a scroll function on an extended menu window including at least one menu (e.g. the menu provided as default), in either of the first state and the second state, the processor 220 may change the displayed portion of the menu displayed in the extended menu window according the scroll function (e.g. by moving the contents of the menu up and down or back and forth). Upon identifying selection of display of the basic menu window or selection of a back key while displaying the extended menu window including the changed menu, the processor 220 may display the basic menu window including the menu provided as default.

According to various embodiments, the processor 220 (e.g., the processor 120 of FIG. 1) may move a content element selected by the user from among at least one content element included in the content window to the menu window (e.g., the basic menu window or the extended menu window), in either of the first state and the second state.

Figure 12A:
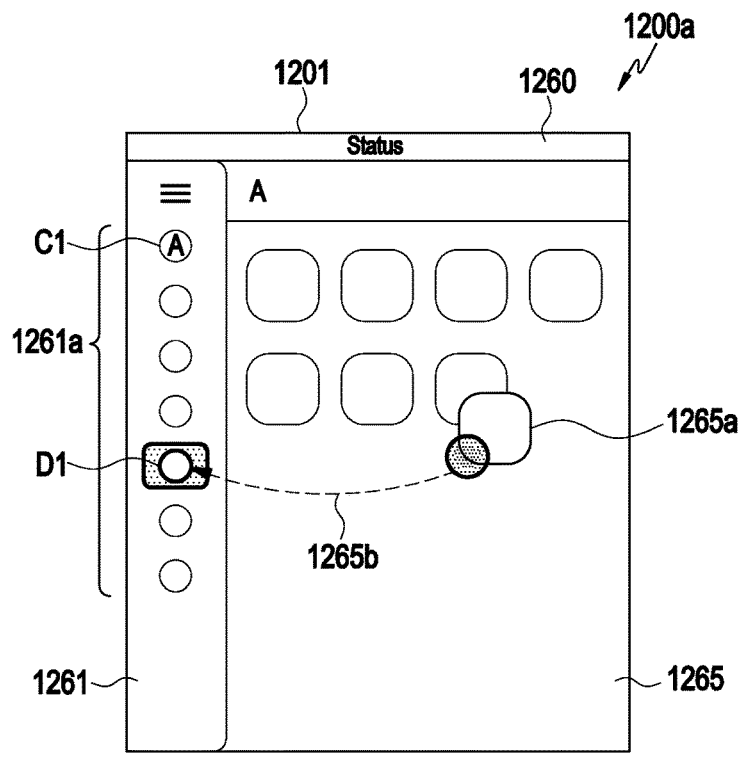
FIGS. 12A and 12B are views illustrating operations of a file organization application operating on a screen on a display in an electronic device, according to various embodiments.
Figure 13A:
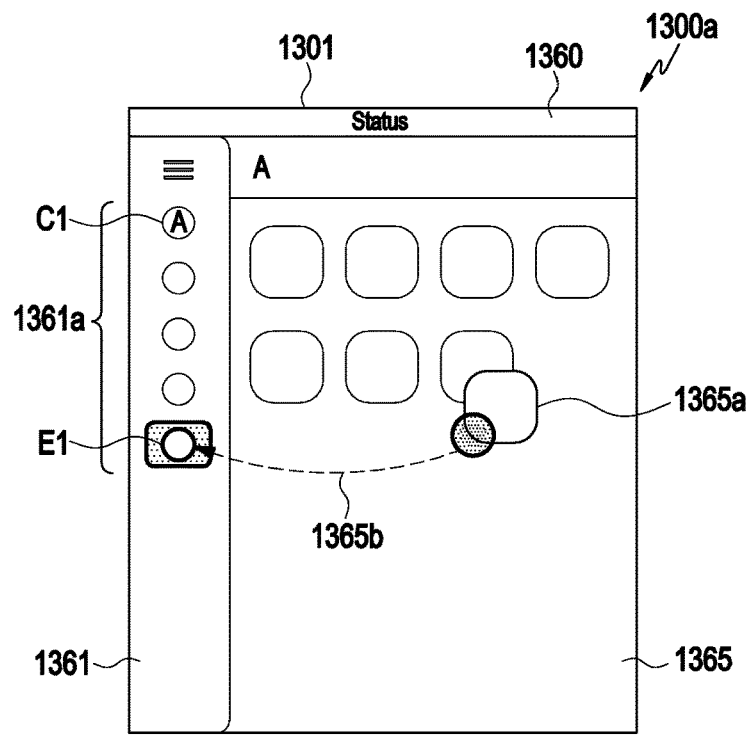
FIGS. 13A to 13C are views illustrating additional operations of a file organization application operating on a screen on a display in an electronic device, according to various embodiments.

According to an embodiment, upon detecting a third gesture (e.g., a drag-and-drop) for moving the content element selected from among the content element(s) included in the content window to the menu window, in either of the first state and the second state, the processor 220 may visually distinguish a menu (e.g. D1 of FIG. 12A or E1 of FIG. 13A) where the selected content element is movable and the menu (e.g. some menus except C1 and D1 among menus (1261*a*) in FIG. 12A or some menus except C1 and E1 among menus (1361*a*) in FIG. 13A) where the selected content is not movable among the menus included in the menu window.

According to an embodiment, the processor 220 may detect the third gesture (e.g., a drag-and-drop) for moving the content element selected from among the content element(s) included in the content window(s) to the basic menu window, in either of the first state and the second state. Upon identifying the presence of at least one sub-menu in the menu to which the content element selected from among the content element(s) included in the basic menu window is to be moved, the processor 220 may display the extended menu window including the menu to which the selected content is to be moved and at least one sub-menu of the menu to which the content is to be moved so that the selected content may be moved to one of the sub-menu(s).

According to various embodiments, upon identifying selection of a content element from among the content element(s) displayed in the content window, while in the first state of displaying the activated menu window (basic menu window or extended menu window) and the activated content window, the processor 220 (e.g., the processor 120 of FIG. 1) may display content corresponding to the selected content element (or at least one content sub-element thereof) on the entire screen of the display 260 without displaying the menu window.

According to various embodiments, upon identifying selection of a content element from among the content element(s) displayed in the first content window among the plurality of content windows, while in the second state of displaying the activated menu window (e.g., basic menu window or extended menu window) and the plurality of activated content windows, the processor 220 (e.g., the processor 120 of FIG. 1) may display content corresponding to the selected content element (or at least one content sub-element thereof) in the second content window among the plurality of content windows.

According to various embodiments, the processor 220 (e.g., the processor 120 of FIG. 1) may visually distinguish a focused menu among the menus included in the menu window from non-focused menus, in either of the first state and the second state.

According to an embodiment, the processor 220 may display the menu window to include a predetermined number of menus displayed and ordered according to a priority among the menus for operating the currently running application, in either of the first state and the second state.

According to an embodiment, the processor 220 may display the menus included in the menu window to be distinguished and sorted by category, in either of the first state and the second state.

According to an embodiment, if a new menu is added to the menu(s) included in the menu window, in either of the first state and the second state, the processor 220 may display an indicator on the new menu to indicate the addition of the new menu.

According to various embodiments, when displaying the execution of a second application displayed in a fixed position of the display 260 while displaying the execution of a first application on the display 260, the processor 220 (e.g., the processor 120 of FIG. 1) may display the execution of the first application and the execution of the second application without an overlap.

According to an embodiment, upon identifying selection of an execution of a second application fixed and displayed in a predetermined area of the display 260 while displaying an execution of a first application on the display 260, the processor 220 may resize an area for displaying the execution of the first application so as not to overlap the predetermined area for displaying the execution of the second application.

According to various embodiments, the processor 220 (e.g., the processor 120 of FIG. 1) may divide the display 260 into a first area positioned on a upper side thereof and a second area positioned on a lower side thereof, based on sensor information received from the sensor module 267 capable of detecting a folding on the hinge connecting the two housings included in the electronic device 201, and may display an execution of an application in the first area and display a panel including at least one button in the second area.

According to an embodiment, upon identifying an execution of a first application which is a particular type of application (e.g., media session-related application) in the first area, the processor 220 may display, in the second area, a first panel including at least one control button for controlling the first application running in the first area and at least one system button for controlling the system of the electronic device.

According to an embodiment, upon identifying execution of a second application which is a different type of application than the first application (e.g., not a media session-related application) in the first area, the processor 220 may display a second panel including at least one system button for controlling the system of the electronic device in the second area.

According to various embodiments, the memory 230 may be implemented to be substantially the same or similar to the memory 130 of FIG. 1.

According to various embodiments, the display 260 may be implemented in substantially the same or similar manner to the display module 160 of FIG. 1.

According to an embodiment, the display 260 may include a flexible display.

As one example, the display 260 may include a flexible display in which the display areas are divided according to a folding on a hinge capable of connecting two housings where the display is disposed.

As another example, the display 260 may include a rollable-type flexible display in which the display may be drawn into and out of the housing of the electronic device.

As yet another example, the display 260 may include a flexible display including a first area which is always exposed, and a second area which may be inserted into the interior of the housing of the electronic device to conceal it and pulled out of the housing of the electronic device to expose it and extend it from the first area.

According to various embodiments, the sensor module 276 may be implemented to be substantially identical or similar to the sensor module 176 of FIG. 1.

According to an embodiment, the sensor module 276 may include various sensors capable of detecting the folded state of the electronic device, the positioning state (or mounted state) of the electronic device, the rotated state of the electronic device, the inserted or exposed state of the display in/from the housing of the electronic device, and the inserted or exposed state of a partial area (e.g., second area) of the display in/from the housing of the electronic device.

According to an embodiment, the sensor module 276 may include at least one of an angle sensor, a tilt sensor, an acceleration sensor, a geomagnetic sensor, a gyro sensor, a motion sensor, a gravity sensor, a proximity sensor, and a hinge sensor. For example, the sensor module 276 may transmit sensor information received from at least one of an angle sensor, a tilt sensor, an acceleration sensor, a geomagnetic sensor, a gyro sensor, a motion sensor, a gravity sensor, a proximity sensor, or a hinge sensor to the processor 220.

According to an embodiment, the communication module 290 (e.g., the communication interface 190 of FIG. 1) may include a plurality of communication circuits using different communication technologies.

According to an embodiment, the communication module 290 may include a mobile communication module (not shown) or a sub communication module (not shown) performing short-range communication with a wireless LAN. The communication module 290 may perform communication with an external device using at least one antenna (not shown) under the control of the processor 220.

According to an embodiment, the communication module 290 may include at least one of a wireless LAN module (not shown) and a short-range communication module (not shown) which may include an NFC communication module, a UWB communication module, a Bluetooth legacy communication module, and/or a BLE communication module.

Figure 3A:
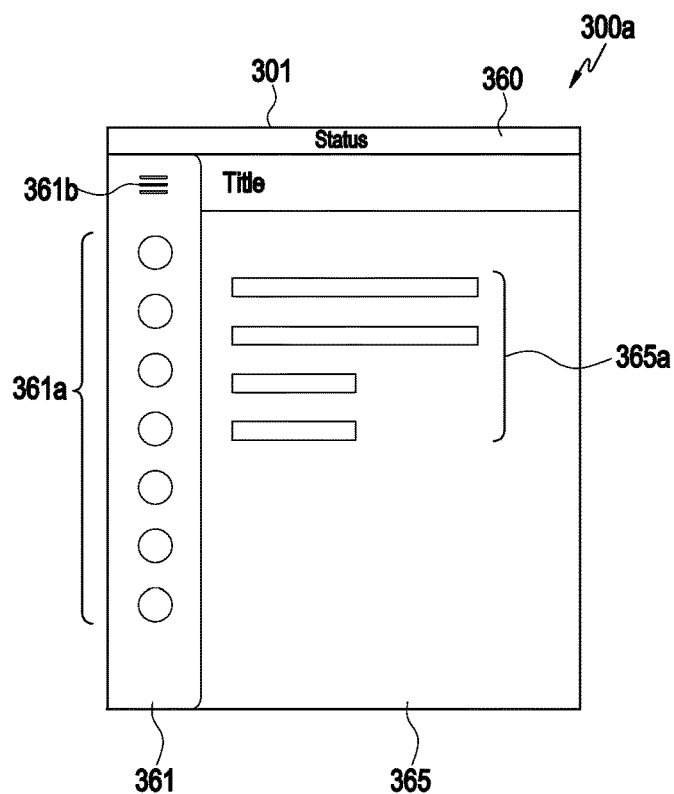
FIGS. 3A and 3B are views illustrating an operation of transitioning a screen of a display in a first state between a basic menu window and an extended menu window in an electronic device, according to various embodiments.
Figure 3B:
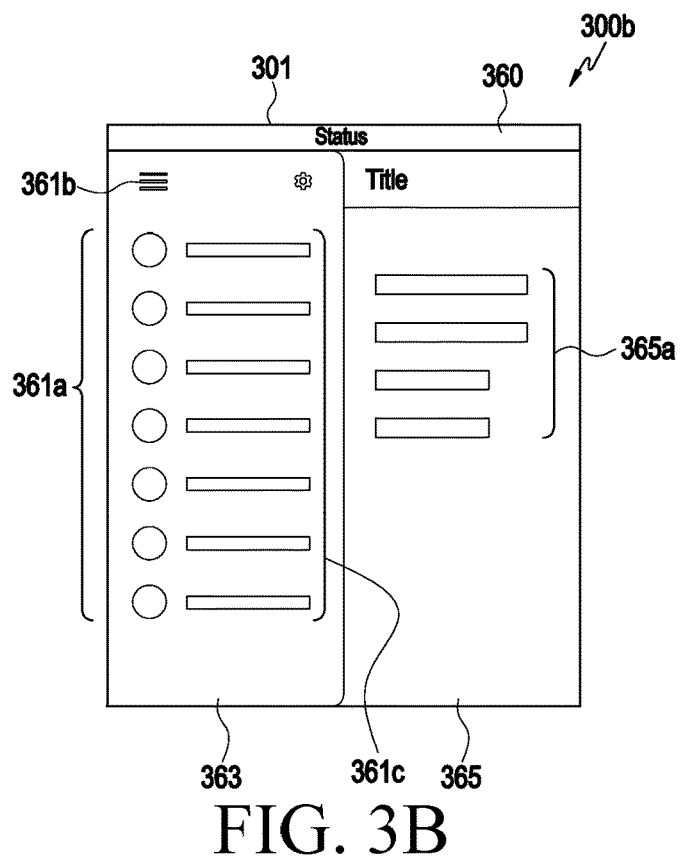

FIGS. 3A and 3B are views 300a and 300b illustrating an operation of transitioning a screen of a display in a first state between a basic menu window and an extended menu window in an electronic device, according to various embodiments.

Referring to FIG. 3A, the electronic device 301 (e.g., the electronic device 101 of FIG. 1 or the electronic device 201 of FIG. 2) may detect a change in the screen of the display based on sensor information from the sensor module (e.g., the sensor module 276 of FIG. 2). The electronic device 301 may identify screen size information (e.g., width information or height information about the display) about the display 360 as first screen size information (e.g., indicating a size measurement between 600 dp and 959 dp) based on the change in the screen of the display and, upon identifying a display setting of the menu window (e.g., a set default state of the menu window) for the first state as the basic menu window 361, switch into the first state of displaying, on the display 360, the basic menu window 361 within the area having the first size and the content window 365 within an area not overlapping the basic menu window 361. The electronic device 301 may display, in the first state, the activated basic menu window 361 including at least one menu 361a selectable by the user, and the activated content window 365 including at least one content element 365a selectable by the user. An icon 361b, which may be located in the basic menu window 361 as illustrated in FIG. 3A, is designated for activating display of the extended menu window. Upon identifying selection of the icon 361b while displaying the basic menu window 361 and the content window 365 on the display 360, the electronic device 301 may display the extended menu window 363 and the content window 365 on the display 360 as shown in FIG. 3B.

Referring to FIG. 3B, the electronic device 301 may display on the display 360, instead of the basic menu window 361, the extended menu window 363, within an area having a second size greater than the size of the area and of the basic menu window. The electronic device 301 may include, in the extended menu window 363, at least one menu 361a from the basic menu window 361, and information about the menu (or at least one sub-menu included in the menu) 361c. The electronic device 301 may reduce the size of (resize) the content window 365 to fit within an area not overlapping the extended menu window 363, the area based on the size of the extended menu window 363. By reducing the size of the content element(s) 365a displayed in the content window 365 to correspond to the resizing of the content window 365, the electronic device 301 may display all of the content element 365a in the content window 365. An icon 361b, which may be located in the extended menu window 363 as illustrated in FIG. 3B, is designated for activating display of the basic menu window 361. Upon identifying selection of the icon 361b while displaying the extended menu window 363 and the content window 365 on the display 360, the electronic device 301 may display, on the display 360, the basic menu window 361 and the content window 365 as shown in FIG. 3A.

Figure 4A:
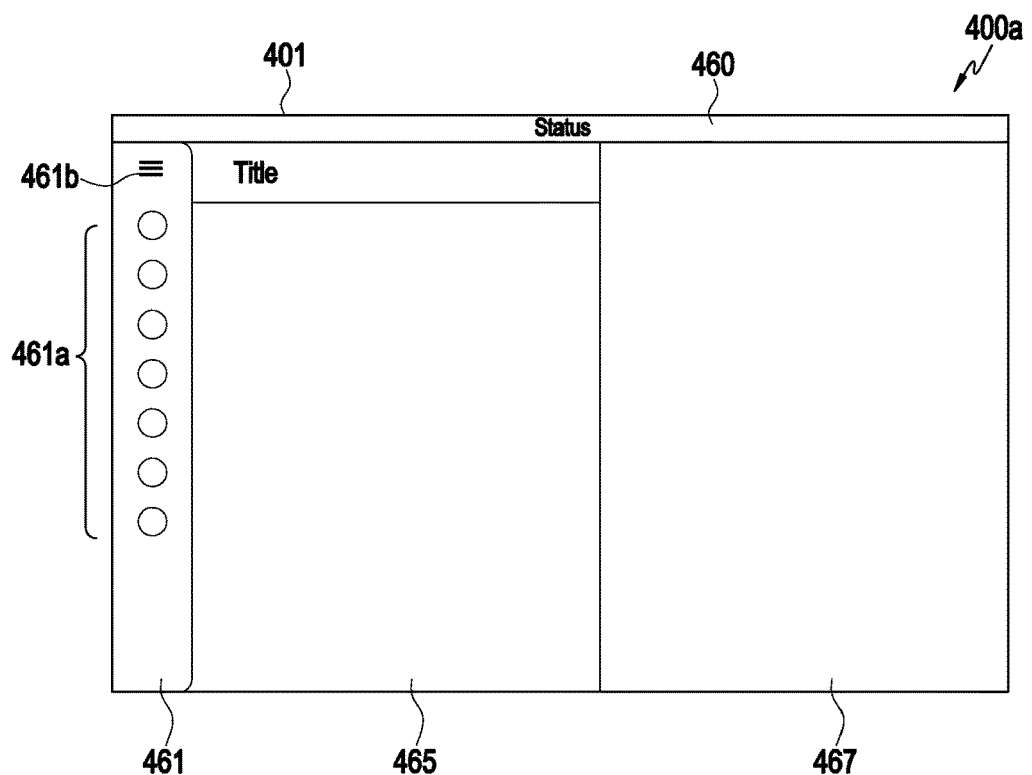
FIGS. 4A and 4B are views illustrating an operation of transitioning a screen of a display in a second state between a basic menu window and an extended menu window in an electronic device, according to various embodiments.
Figure 4B:
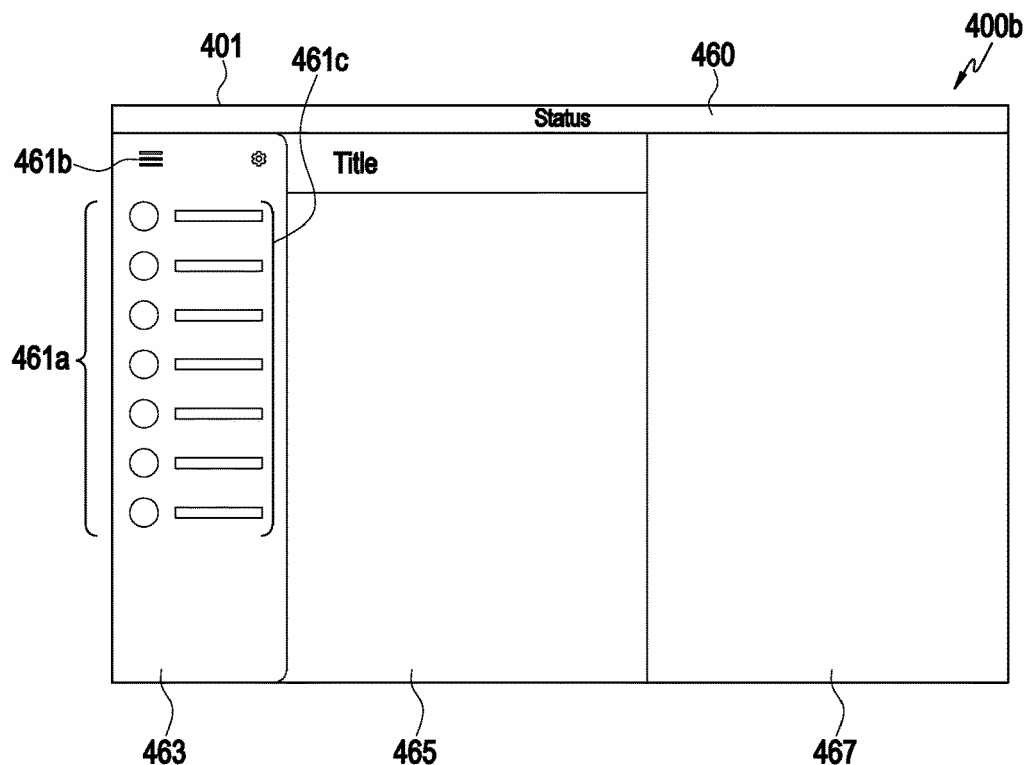

FIGS. 4A and 4B are views 400a and 400b illustrating an operation of transitioning a screen of a display in a second state between a basic menu window and an extended menu window in an electronic device, according to various embodiments.

Referring to FIG. 4A, the electronic device 401 (e.g., the electronic device 101 of FIG. 1 or the electronic device 201 of FIG. 2) may detect a change in the screen of the display based on sensor information from the sensor module (e.g., the sensor module 276 of FIG. 2). The electronic device 401 may identify screen size information (e.g., width information or height information about the display) about the display 460 as second screen size information (e.g., indicating a size measurement of 960 dp or more) based on the change in the screen of the display and, upon identifying a display setting of the menu window (e.g., a set default state of the menu window) for the second state as the basic menu window 461, switch into the second state of displaying, on the display 460, the basic menu window 461 within the area with the first size and a plurality of content windows 465 and 467 each within an area not overlapping the basic menu window 461. The electronic device 401 may display, in the second state, the activated basic menu window 461 including at least one menu 461a selectable by the user, and the plurality of activated content windows 465 and 467 including at least one content element (not depicted) selectable by the user. An icon 461b, which may be located in the basic menu window 461 as illustrated in FIG. 4A, is designated for activating display of the extended menu window. Upon identifying selection of the icon 461b while displaying the basic menu window 461 and the plurality of content windows 465 and 467 on the display 460, the electronic device 401 may display the extended menu window 463 and the plurality of content windows 465 and 467 on the display 460 as shown in FIG. 4B.

Referring to FIG. 4B, the electronic device 401 may display on the display 460, instead of the basic menu window 461, the extended menu window 463, within the area with the second size greater than the size of the area of the basic menu window. The electronic device 401 may include, in the extended menu window 463, at least one menu 461a included in the basic menu window 461, and at least one selectable sub-menu 461c included in the menu. The electronic device 401 may reduce the size of (resize) the plurality of content windows 465 and 467 to fit within an area not overlapping the extended menu window 463, the area based on the size of the extended menu window 463. By reducing the size of the content element(s) displayed in each of the plurality of content windows 465 and 467 to correspond to the resizing of the plurality of content windows 465 and 467, the electronic device 401 may display all of the content element(s) in each of the plurality of content windows 465 and 467. An icon 461b, which may be located in the extended menu window 463 as illustrated in FIG. 4B, is designated for activating display of the basic menu window 461. Upon identifying selection of the icon 461b while displaying the extended menu window 463 and the plurality of content windows 465 and 467 on the display 460, the electronic device 401 may display, on the display 460, the basic menu window 461 and the plurality of content windows 465 and 467 as shown in FIG. 4A.

Figure 5A:
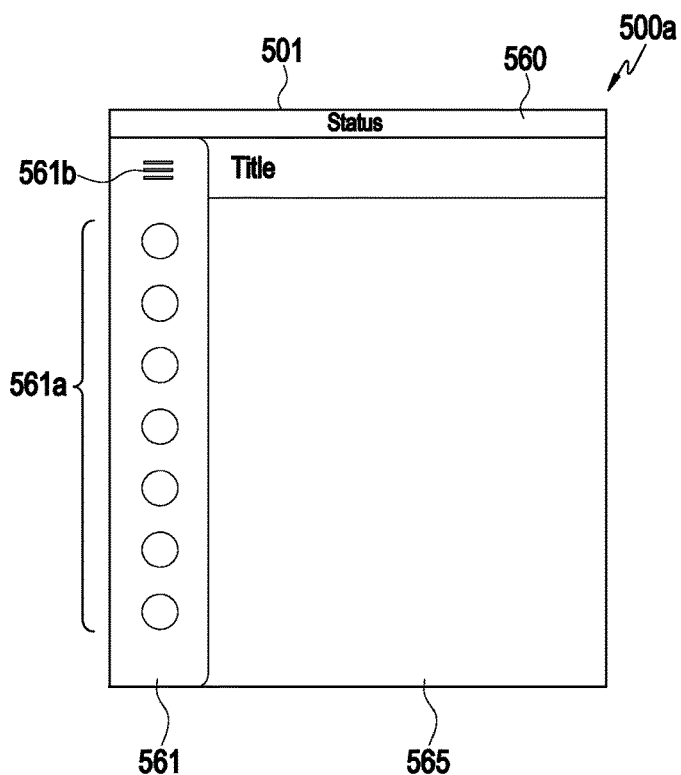
FIGS. 5A and 5B are views illustrating an operation of transitioning a screen of a display between a first state and a second state in an electronic device, according to various embodiments.
Figure 5B:
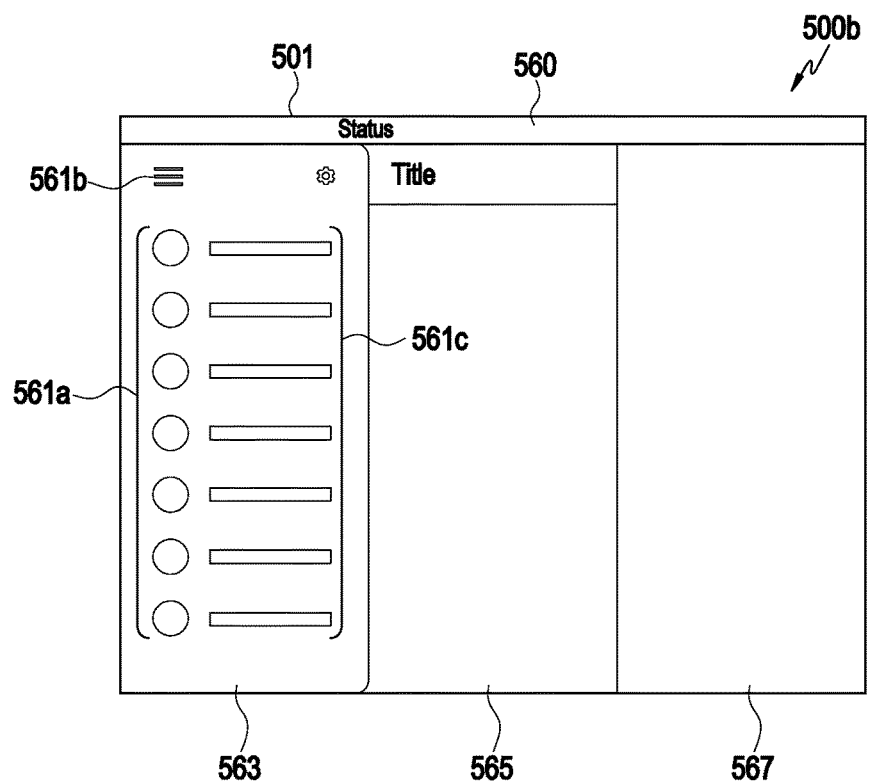

FIGS. 5A and 5B are views 500a and 500b illustrating an operation of transitioning a screen of a display between a first state and a second state in an electronic device, according to various embodiments.

Referring to FIG. 5A, the electronic device 501 (e.g., the electronic device 101 of FIG. 1 or the electronic device 201 of FIG. 2) may detect the rotated state of the electronic device 501 based on sensor information from the sensor module (e.g., the sensor module 276 of FIG. 2). The electronic device 501 may identify the portrait mode of the electronic device based on the sensor information from the sensor module and identify the screen size information (e.g., width information or height information about the display) about the display 560 in the portrait mode, as first screen size information (e.g., indicating a size measurement between 600 dp and 959 dp). Upon identifying a display setting of the menu window (e.g., a set default state of the menu window) for the first state as the basic menu window 561, the electronic device 501 may switch into the first state of displaying, on the display 560, the basic menu window 561 within the area with the first size, and the content window 565 within an area not overlapping the basic menu window 561.

Referring to FIG. 5B, the electronic device 501 may identify the landscape mode of the electronic device based on the sensor information from the sensor module and identify the screen size information (e.g., width information or height information about the display) about the display 560 in the landscape mode of the electronic device, as second screen size information (e.g., indicating a size measurement of 960 dp or more). Upon identifying a display setting of a menu window (e.g., a set default state of the menu window) for the second state as the extended menu window 563, the electronic device 501 may switch into the second state of displaying, on the display 560, the extended menu window 563 within the area with the second size greater than the size of the area of the basic menu window, and a plurality of content windows 565 and 567 within an area not overlapping the extended menu window 563.

Figure 6A:
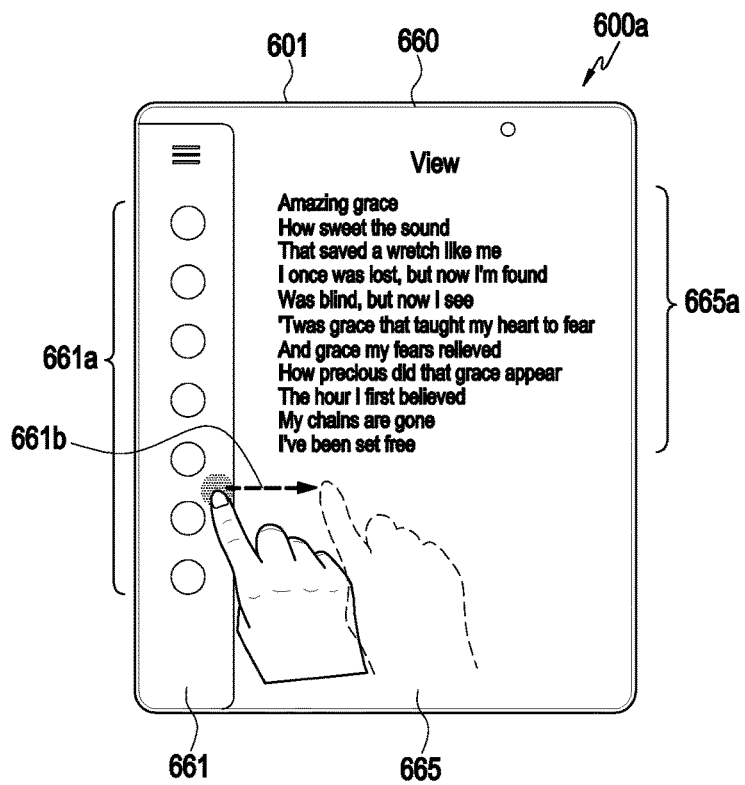
FIGS. 6A and 6B are views illustrating an operation of transitioning a screen of a display in a first state between a basic menu window and an extended menu window in an electronic device responsive to a gesture, according to various embodiments.
Figure 6B:
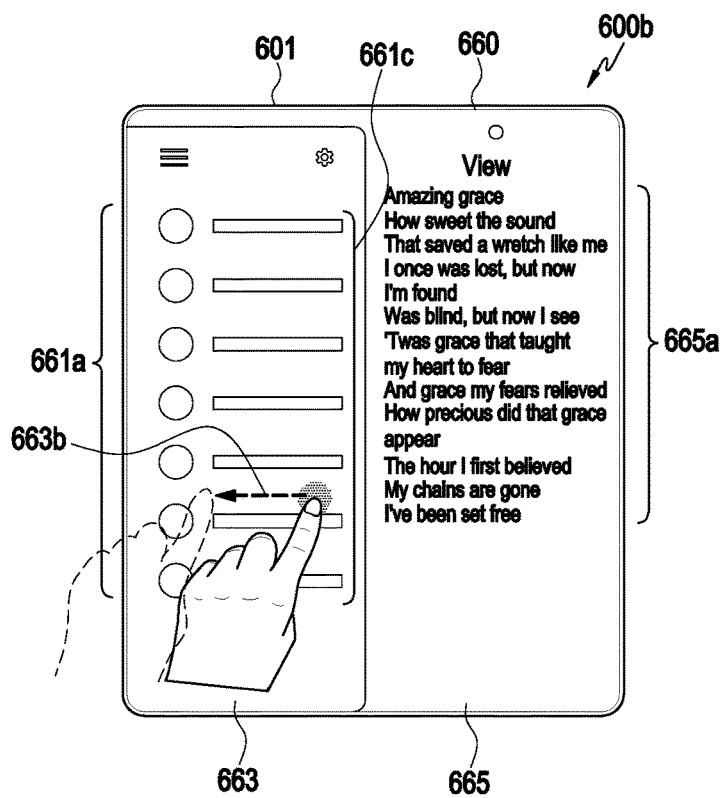

FIGS. 6A and 6B are views 600a and 600b illustrating an operation of transitioning a screen of a display in a first state between a basic menu window and an extended menu window in an electronic device responsive to a gesture, according to various embodiments.

Referring to FIG. 6A, the electronic device 601 (e.g., the electronic device 101 of FIG. 1 or the electronic device 201 of FIG. 2) may detect a change in the screen of the display based on sensor information from the sensor module (e.g., the sensor module 276 of FIG. 2). The electronic device 601 may identify screen size information (e.g., width information or height information about the display) about the display 660 as first screen size information (e.g., indicating a size measurement between 600 dp and 959 dp) based on the change in the screen of the display and, upon identifying a display setting of the menu window (e.g., a set default state of the menu window) for the first state as the basic menu window 661, switch into the first state of displaying, on the display 660, the activated basic menu window 661 within the area with the first size and the activated content window 665 within an area not overlapping the basic menu window 661. The electronic device 601 may display, in the first state, at least one menu 661a selectable by the user in the basic menu window 661, and display text 665a among the contents in the content window 665. A first gesture 661b (e.g., a first drag from the left to right in the basic menu window 661) is designated for activating display of the extended menu window 663. Upon detecting the first gesture 661b while displaying the basic menu window 661 and the content window 665 on the display 660, the electronic device 601 may display the activated extended menu window 663 and the activated content window 665 on the display 660 as shown in FIG. 6B.

Referring to FIG. 6B, the electronic device 601 may display on the display 660, instead of the basic menu window 661, the extended menu window 663, within the area with the second size greater than the size of the area of the basic menu window. The electronic device 601 may include, in the extended menu window 663, at least one menu 661a from the basic menu window 661, and information about the menu (or at least one selectable sub-menu included in the menu) 661c. The electronic device 601 may reduce the size of (resize) the content window 665 to an area not overlapping the extended menu window 663, the area based on the size of the extended menu window 663. By adjusting the arrangement of the text 665a displayed in the content window 665 to correspond to the resizing of the content window 665, the electronic device 601 may display all of the text 665a in the content window 665. A second gesture 663b (e.g., a second drag from the right to left in the extended menu window 663) is designated for activating display of the basic menu window 661. Upon detecting the second gesture 663b while displaying the extended menu window 663 and the content window 665 on the display 660, the electronic device 601 may display the basic menu window 661 and the content window 665 on the display 660 as shown in FIG. 6A.

Figure 7A:
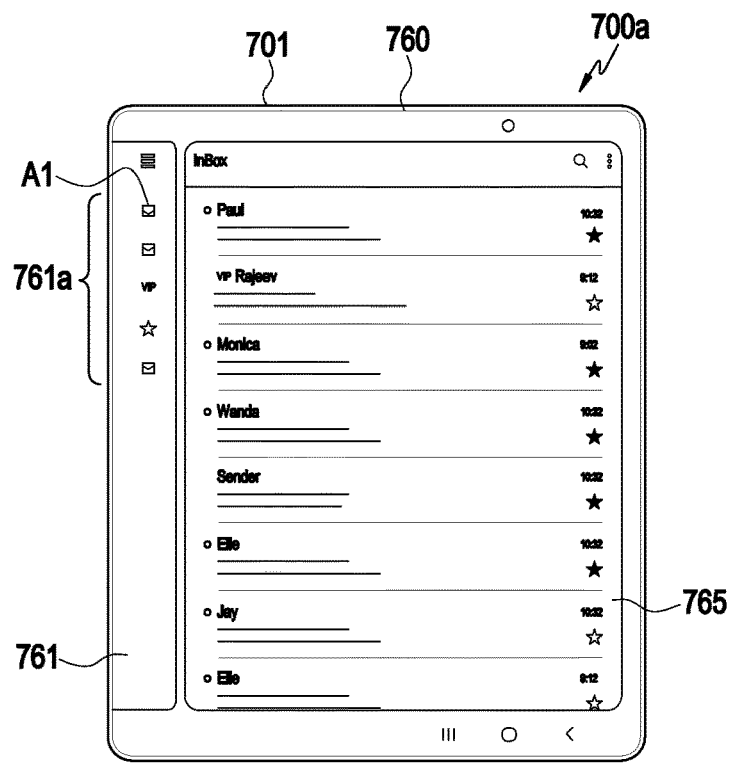
FIGS. 7A and 7B are views illustrating an email application menu operating in both a basic menu window and an extended menu window on a screen of a display in an electronic device, according to various embodiments.
Figure 7B:
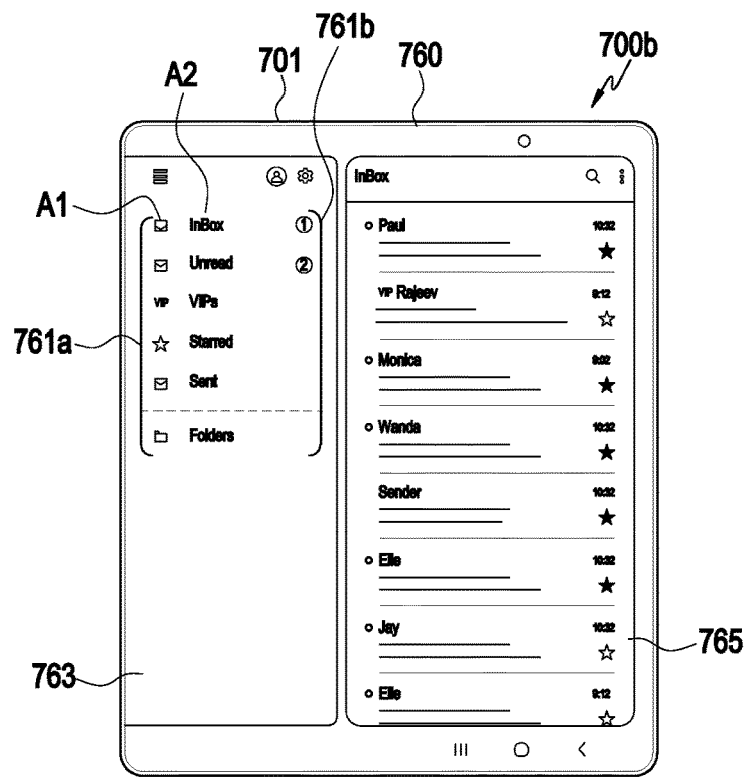

FIGS. 7A and 7B are views 700a and 700b illustrating an email application menu operating in both a basic menu window and an extended menu window on a screen of a display in a first state in an electronic device, according to various embodiments.

Referring to FIG. 7A, upon identifying selection of a first menu A1 (e.g., in the illustrated example, an inbox menu of an email application) among at least one menu 761a included in the basic menu window 761 while the screen is configured in the first state, the electronic device 701 (e.g., the electronic device 101 of FIG. 1 or the electronic device 201 of FIG. 2) may display at least one content element (e.g., in the illustrated example, at least one received email) which may be displayed by selection of the first menu A1 in the content window 765.

Referring to FIG. 7B, the electronic device 701 may include and display at least one menu 761a and information 761b about the menu 761a in the extended menu window 763 in the first state of displaying the extended menu window 763 and the content window 765. Upon identifying selection of the first menu A1 (e.g., in the illustrated example, an inbox menu of an email application) among the menus 761a included in the extended menu window 763, the electronic device 701 may display at least one content element (e.g., in the illustrated example, at least one email received) to be displayed by selection of the first menu A1 in the content window 765.

Figure 8A:
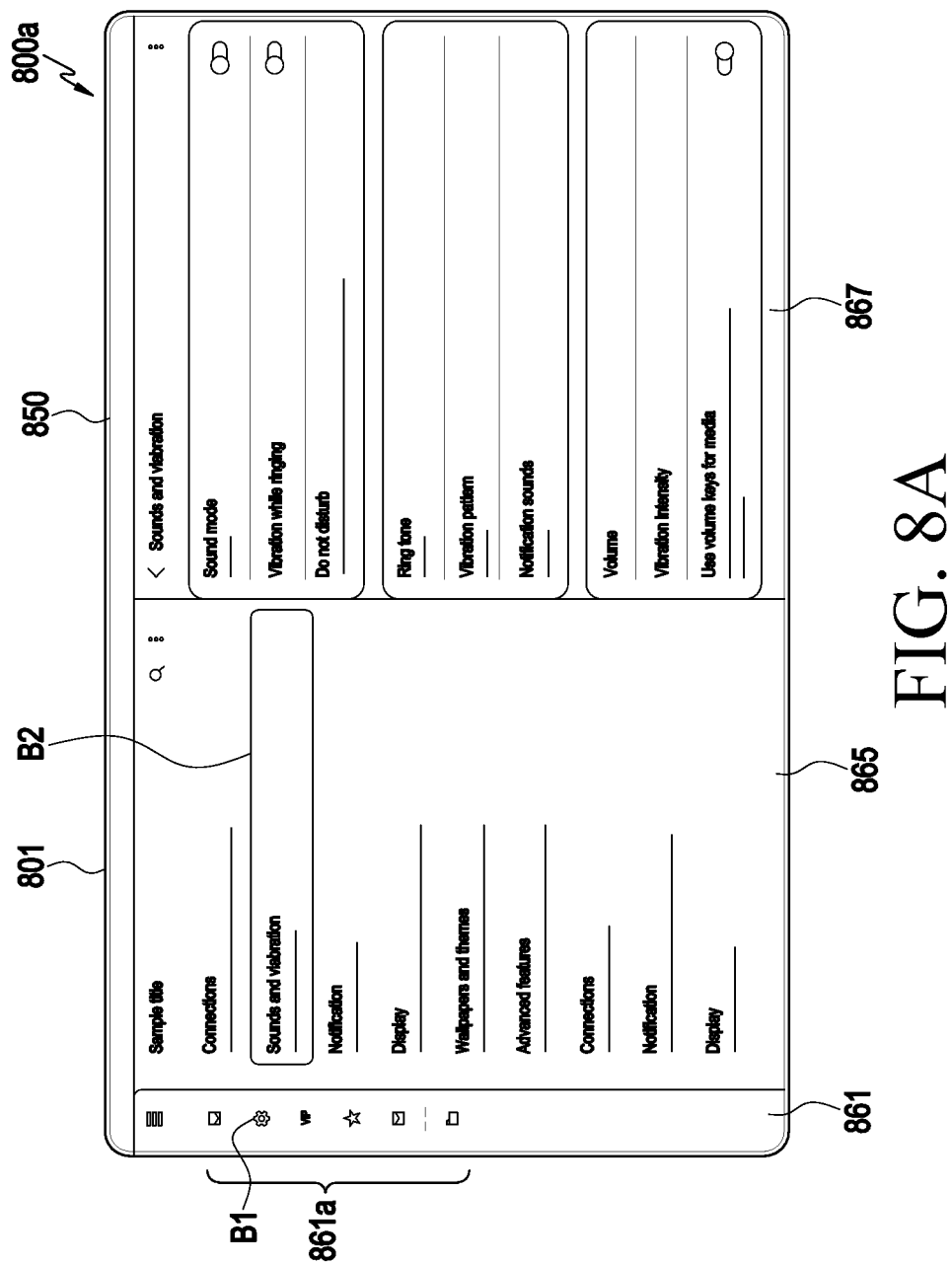
FIGS. 8A and 8B are views illustrating a settings menu operating in both a basic menu window and an extended menu window on a screen of a display in an electronic device, according to various embodiments.
Figure 8B:
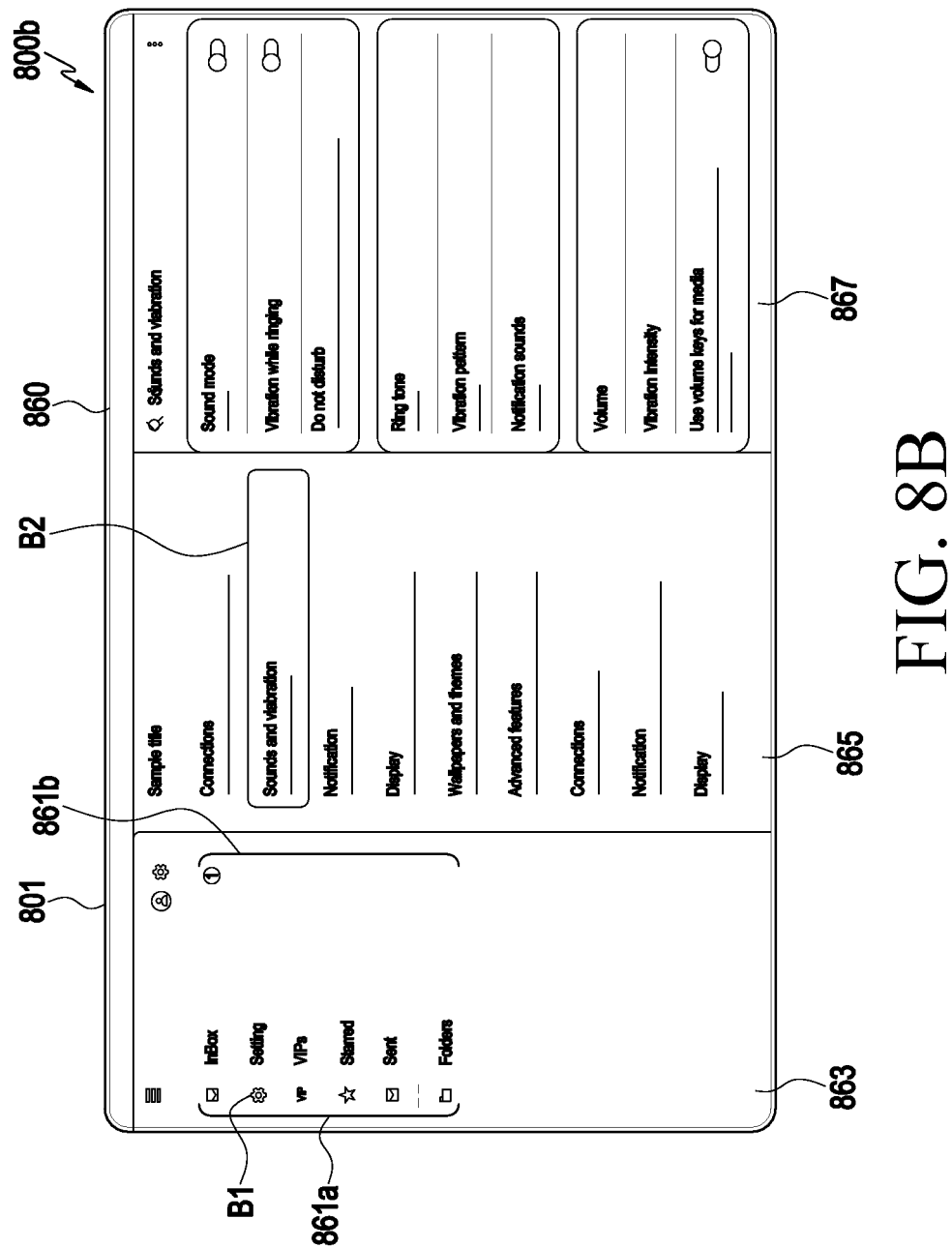

FIGS. 8A and 8B are views 800a and 800b illustrating a settings menu operating in both a basic menu window and an extended menu window on a screen of a display in a second state in an electronic device, according to various embodiments.

Referring to FIG. 8A, the electronic device 801 (e.g., the electronic device 101 of FIG. 1 or the electronic device 201 of FIG. 2) is operating in the second state, and may include and display at least one menu 861a and information 861b about the menu 861a in the basic menu window 861. Upon identifying selection of a second menu B1 (e.g., in the illustrated example, a settings menu) among the menus 861a included in the basic menu window 861, the electronic device 301 may display at least one corresponding content element (e.g., in the illustrated example, settings options of the electronic device) in a first content window 865 among a plurality of content windows 865 and 867. Upon identifying selection of a content element B2 (e.g., in the illustrated example, the sound and vibration settings of the electronic device) among the content elements displayed in the first content window 865, the electronic device 801 may display at least one content sub-element of the selected content element B2 in a second content window 867.

Referring to FIG. 8B, the electronic device 801 is operating in the second state, and may include and display at least one menu 861a and information 861b about the menu 861a in the extended menu window 863. Upon identifying selection of the second menu B1 (e.g., in the illustrated example, the settings menu) among the menus 861a included in the extended menu window 863, the electronic device 801 may display at least one corresponding content element (e.g., in the illustrated example, the setting options of the electronic device) in the first content window 865 among the plurality of content windows 865 and 867. Upon identifying selection of a content element B2 (e.g., in the illustrated example, the sound and vibration settings of the electronic device) among the content elements displayed in the first content window 865, the electronic device 801 may display at least one content sub-element of the selected content element B2 in the second content window 867.

Figure 9A:
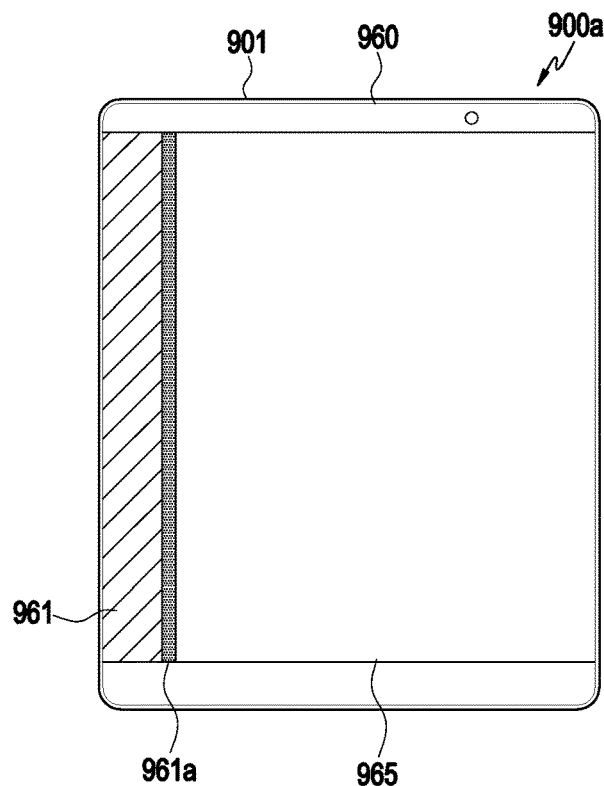
FIGS. 9A and 9B are views illustrating arrangements of a menu window on a display in an electronic device, according to various embodiments.
Figure 9B:
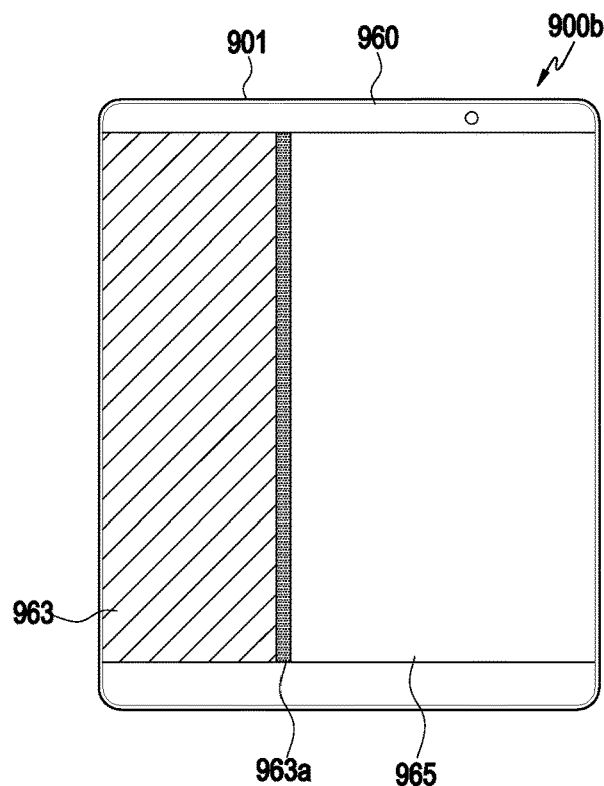

FIGS. 9A and 9B are views 900a and 900b illustrating arrangements of a menu window on a display in an electronic device, according to various embodiments.

Referring to FIG. 9A, the electronic device 901 (e.g., the electronic device 101 of FIG. 1 or the electronic device 201 of FIG. 2) may set an area of the basic menu window 961 and a predetermined area 961a (e.g., 12 dp) as an available areas of the basic menu window 961, if the predetermined area set by a user for an additional available area of the basic menu window 961 exists, when placing and displaying the basic menu window 961 in the left area of the display 960 in the first state of displaying the basic menu window 961 and the content window 965. The predetermined area 961a may be added to the left of the basic menu window 961. For example, the electronic device 901 detects the first gesture (e.g., the first drag from the left to right) for displaying the extended menu window in the available area of the basic menu window. The electronic device 901 may identify the added area 961a set by the user.

Referring to FIG. 9B, the electronic device 901 may set an area of the extended menu window 963 and a predetermined area 963a (e.g., 12 dp) as an available areas of the extended menu window 963, if the predetermined area set by a user for an additional available area of the extended menu window 963 exists, when placing and displaying the extended menu window 963 in the left area of the display 960 in the first state of displaying the extended menu window 963 and the content window 965. The predetermined area 963a may be added to the left of the extended menu window 961. For example, the electronic device 901 detects the second gesture (e.g., the second drag from the right to left) for displaying the basic menu window in the available area of the second menu. The electronic device 901 may identify the added area 963a set by the user.

Figure 10A:
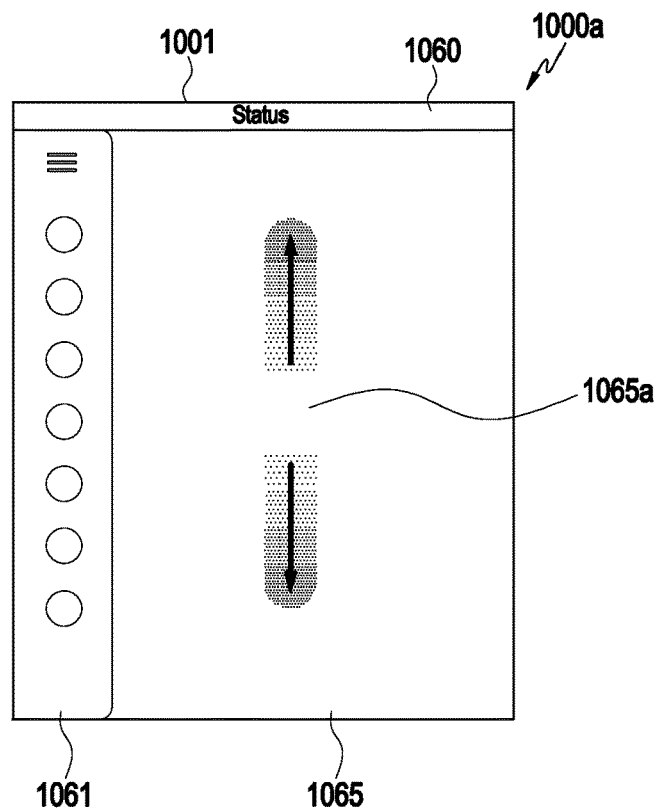
FIGS. 10A to 10C are views illustrating control operations and features for a screen on a display in an electronic device, according to various embodiments.
Figure 10B:
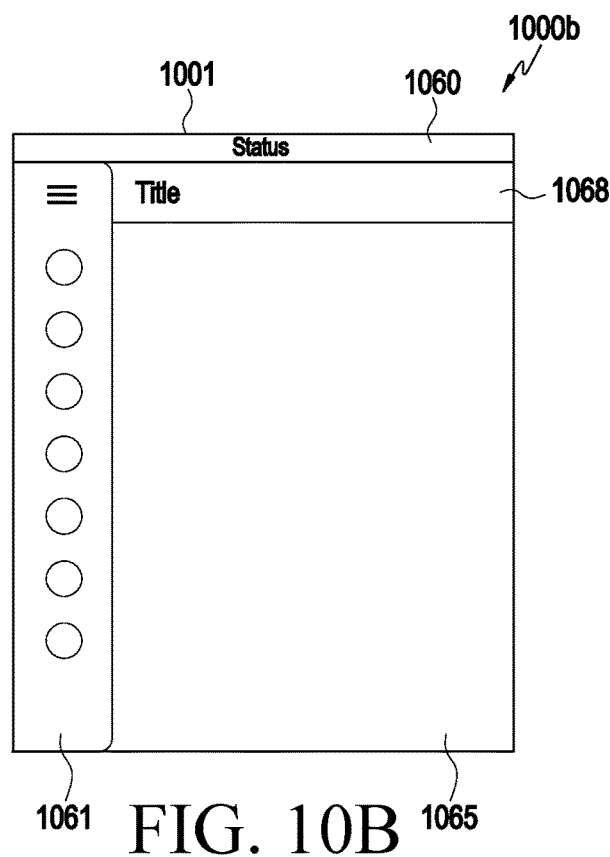
Figure 10C:
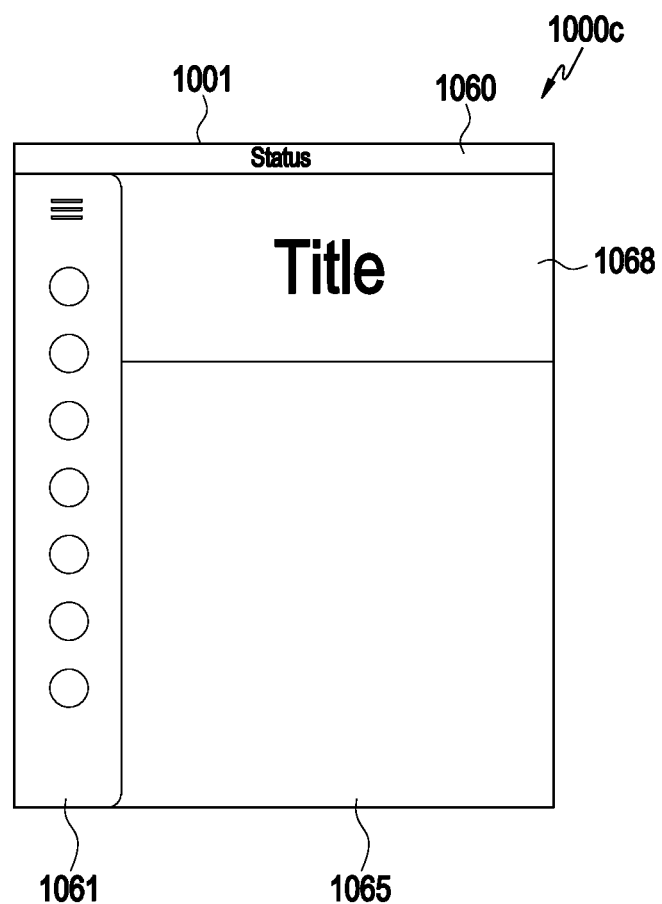

FIGS. 10A to 10C are views 1000a, 1000b, and 1000c illustrating control operations and features for a screen on a display in an electronic device, according to various embodiments.

Referring to FIG. 10A, the electronic device 1001 (e.g., the electronic device 101 of FIG. 1 or the electronic device 201 of FIG. 2) operating in the first state may recognize the gesture 1065a detected within the content window 1065 as an operation in the content window 1065, and may not recognize it as an operation in the basic menu window 1061. Additionally, the electronic device 1001 may recognize a gesture detected within the basic menu window 1061 (not depicted) as an operation in the menu window, and may not recognize it as an operation in the content window 1065.

Referring to FIG. 10B, the electronic device 301 may provide a partial area (e.g., an upper area) of the content window 1065 as an application bar area 1068. The application bar area 1068 is capable of displaying information about the currently running application, in the first state of displaying the basic menu window 1061 and the content window 1065.

As shown in FIG. 10C, if an event or information related to the application is updated while the application bar area 1068 is displaying the information about the currently running application, the electronic device 1001 may resize the application bar area 1068.

Figure 11A:
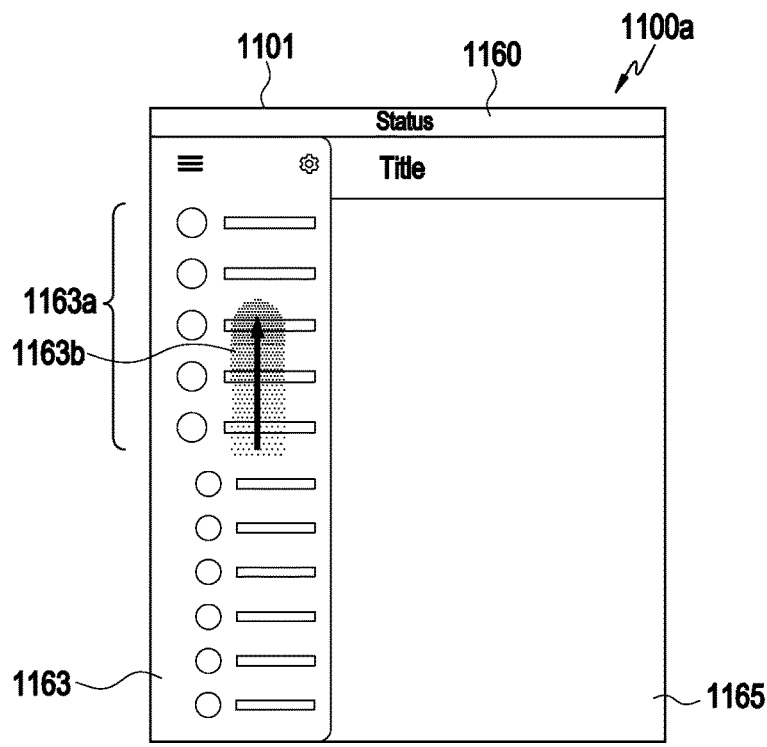
FIGS. 11A to 11C are views illustrating additional control operations and features for a screen on a display in an electronic device, according to various embodiments.
Figure 11B:
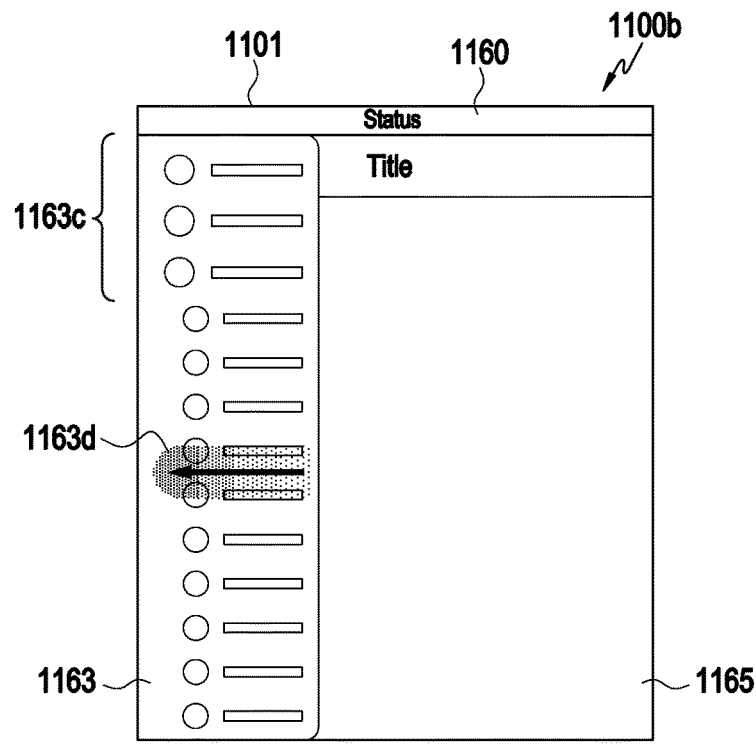
Figure 11C:
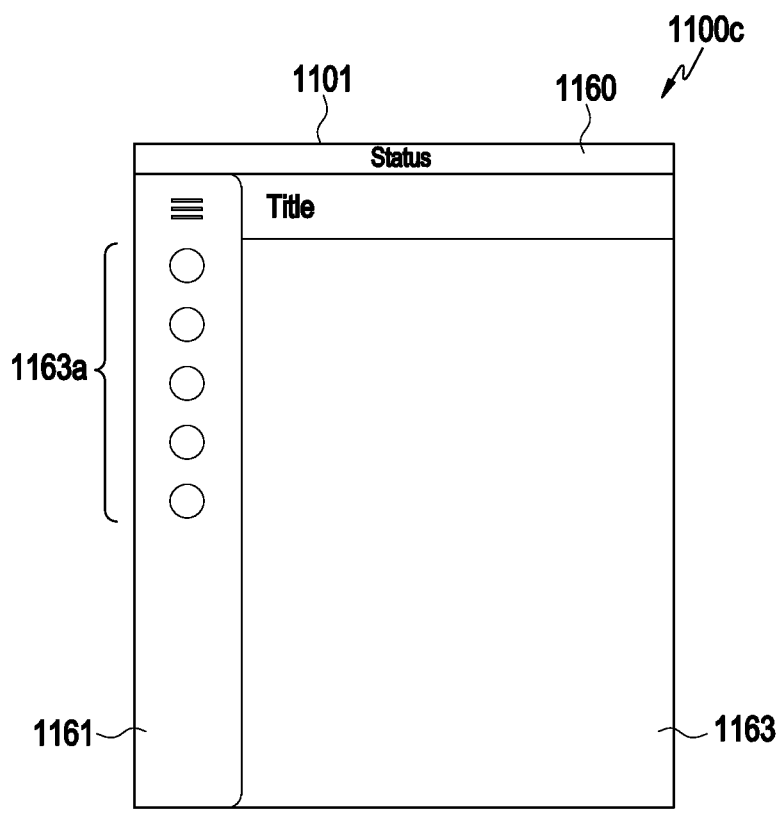

FIGS. 11A to 11C are views 1100a, 1100b, and 1100c illustrating additional control operations and features for a screen on a display in an electronic device according to various embodiments.

Referring to FIG. 11A, the electronic device 1101 (e.g., the electronic device 101 of FIG. 1 or the electronic device 201 of FIG. 2) in the first state may provide a scroll function to the extended menu window 1163. (The content window 1165 is also displayed in this example but will not be used in the described operations.) Upon detecting a gesture 1163b designated for performing the upward scroll function while displaying a set of menus 1163a displayed by default (as "top-most" menus) in the extended menu window 1163, the electronic device 1101 may change the display to show a different set of menus 1163c in the extended menu window 1163 after the upper scroll function is performed, as shown in FIG. 11B.

Referring to FIG. 11B, upon detecting a second gesture 1163d designated for activating display of the basic menu window, or upon identifying selection of a back key while displaying the extended menu window 1163, the electronic device 1101 may display the basic menu window 1161 and the content window 1165 on the display 1160 as shown in FIG. 11C.

Referring to FIG. 11C, the electronic device 1101 may rearrange the different set of menus 1163c displayed in the extended menu window 1163 and include and display the default set of menus 1163a in the basic menu window 1161.

Figure 12B:
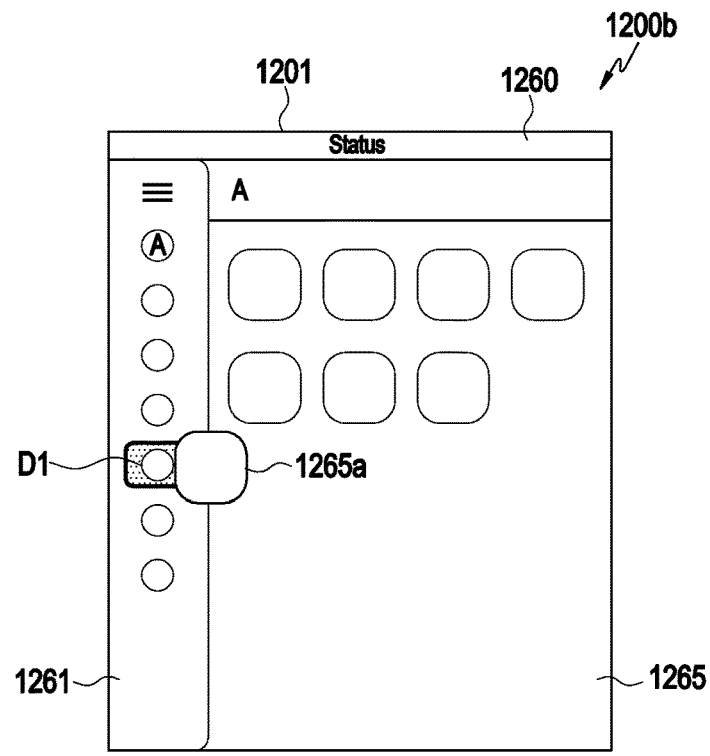

FIGS. 12A and 12B are views 1200a and 1200B illustrating a file organization application operating on a screen on a display in an electronic device, according to various embodiments.

Referring to FIG. 12A, in the first state, upon identifying selection of a first menu C1 (e.g., in the illustrated example, a file folder "A") among a set of menus 1261a included in the basic menu window 1261, the electronic device 1201 (e.g., the electronic device 101 of FIG. 1 or the electronic device 201 of FIG. 2) may display at least one content element (e.g., files within folder "A") in the content window 1265. Upon detecting a third gesture 1265b (e.g., a drag-and-drop) designated for moving a file 1265a selected by the user from among the files displayed in the content window 1265 to the basic menu window 1261, the electronic device 1201 may separately display the menu (e.g., the second menu D1) where the first file 1265a selected from among the menus included in the basic menu window 1261 is movable and the menu (e.g. some menus except C1 and D1 among the set of menus (1261a)) where the selected first file 1265a is not movable.

Referring to FIG. 12B, the electronic device 1201 may move (or copy) the file 1265a, selected by the user from among the files displayed in the content window 1265, to the second menu D1 among the menus 1261a included in the basic menu window 1261, based on the third gesture 1265b (e.g., a drag-and-drop) to move the file 1265a to the basic menu window 1261.

Figure 13B:
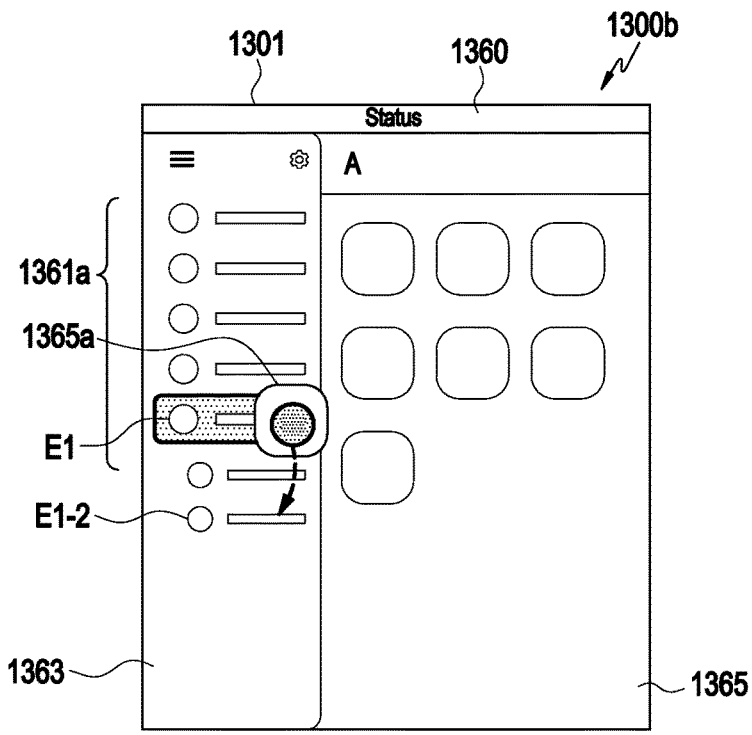
Figure 13C:
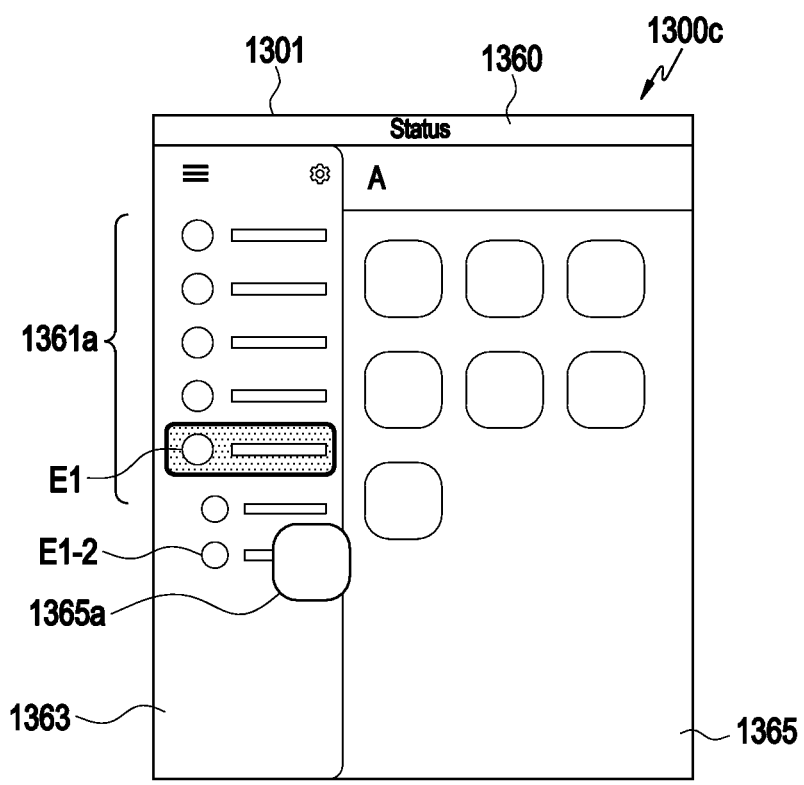

FIGS. 13A to 13C are views 1300a, 1300b, and 1300c illustrating additional operations of a file organization application operating on a screen on a display in an electronic device, according to various embodiments.

Referring to FIG. 13A, in the first state, upon identifying selection of a first menu C1 (e.g., in the illustrated example, a file folder "A") among the menus 1361a included in the basic menu window 1361, the electronic device 1301 (e.g., the electronic device 101 of FIG. 1 or the electronic device 201 of FIG. 2) may display at least one content element (e.g., files within folder "A") in the content window 1365. Upon detecting a third gesture 1365b (e.g., a drag-and-drop) for moving a first file 1365a selected by the user from among the files displayed in the window 1365 for providing content to the basic menu window 1361, the electronic device 1301 may separately display the menu (e.g., the third menu E1) where the first file 1365a selected from among the menus included in the basic menu window 1361 for providing the menu is movable and the menu (e.g. some menus except C1 and E1 among the menus (1361a)) where the selected first file 1365a is not movable.

Referring to FIG. 13B, when positioning the file 1365a, selected by the user from among the files displayed in the content window 1365, near the third menu E1 among the menus 1361a included in the basic menu window 1361, based on the second gesture 1365b (e.g., a drag-and-drop) to move the first file 1365a to the basic menu window 1361, the electronic device 1301 may identify the presence of at least one sub-menu. The electronic device 1301 may display an extended menu window 1363 including the third menu E1 and at least one sub-menu (e.g., sub-menu E1-2) of the third menu E1 so that the file 1365a may be moved (or copied) to the sub-menu E1-2 of the third menu E1.

Referring to FIG. 13C, the electronic device 1301 may move (or copy) the file 1365a, selected by the user from among the files displayed in the content window 1365, to the sub-menu E1-2 of the third menu E1 among the menus 1361a included in the extended menu window 1363.

Figure 14A:
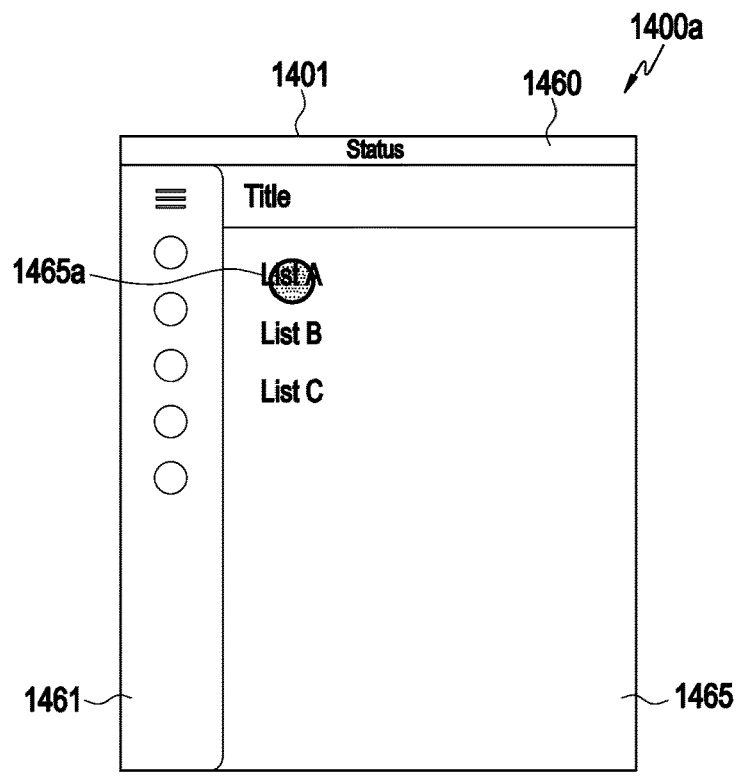
FIGS. 14A and 14B are views illustrating operations of a list organization application operating on a screen on a display, in a first state, in an electronic device, according to various embodiments.
Figure 14B:
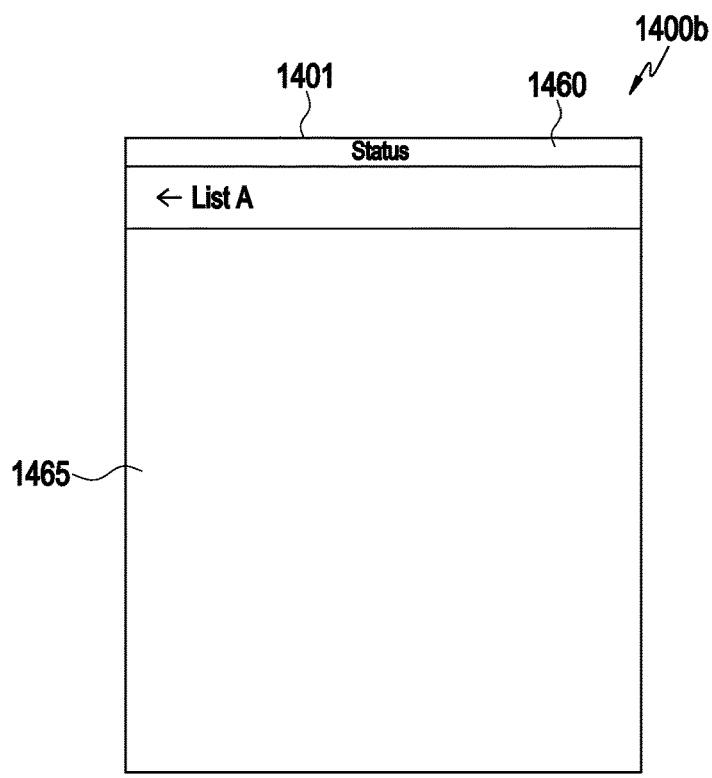

FIGS. 14A and 14B are views 1400a and 1400B illustrating operations of a list organization application operating on a screen on a display, in a first state, in an electronic device, according to various embodiments.

Referring to FIG. 14A, in the first state, upon identifying selection of a content element 1465a (e.g., in the illustrated example, a List A) from among a set of content elements (e.g., in the illustrated example, List A, List B, and List C) included in the content window 1465, the electronic device 1401 (e.g., the electronic device 101 of FIG. 1 or the electronic device 201 of FIG. 2) may display content corresponding to the selected content element 1465a or at least one content sub-element of the selected content element 1465a on the entire screen of the display 1460 as shown in FIG. 14B.

Referring to FIG. 14B, the electronic device 1401 may set the entire area of the display 1460 as the content window 1465 without displaying the basic menu window 1461 on the display 1460, and may display, in the content window 1465, the content corresponding to the selected content element 1465a (List A) or at least one content sub-element of the selected content element 1465a.

Figure 15A:
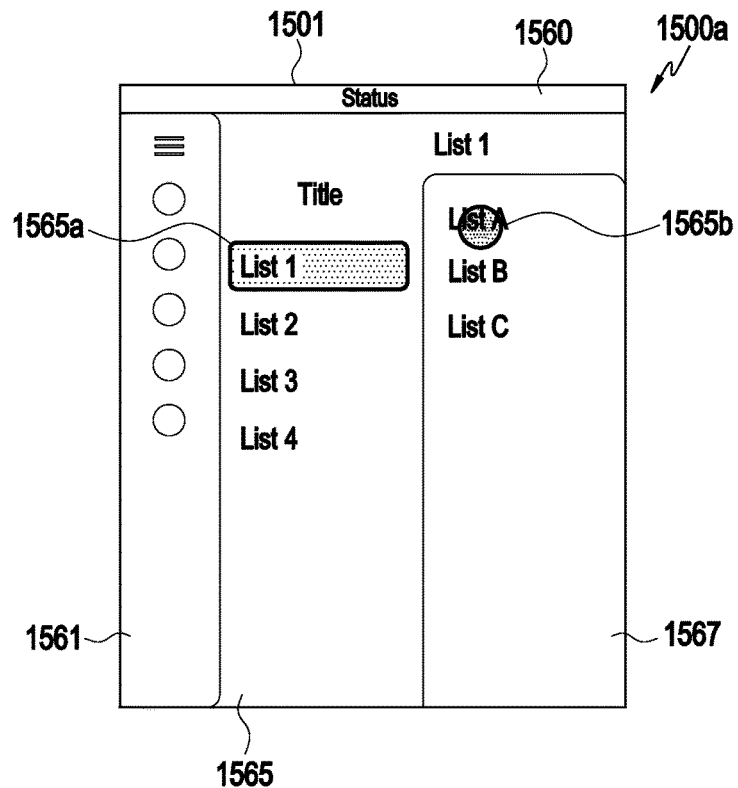
FIGS. 15A and 15B are views illustrating operations of a list organization application operating on a screen on a display, in a second state, in an electronic device, according to various embodiments.
Figure 15B:
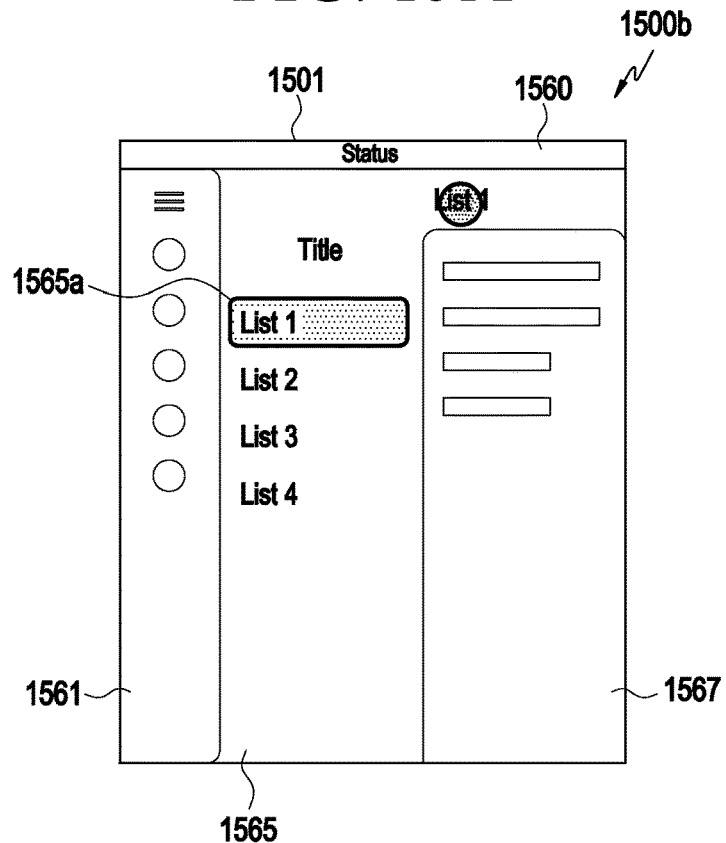

FIGS. 15A and 15B are views 1500a and 1500B illustrating operations of a list organization application operating on a screen on a display, in a second state, in an electronic device, according to various embodiments.

Referring to FIG. 15A, in the second state, upon identifying selection of the content element 1565a (e.g., in the illustrated example, a List 1) from among a set of content elements (e.g., in the illustrated example, List 1, List 2, List 3, and List 4) included in the first content window 1565 of the plurality of content windows, the electronic device 1501 (e.g., the electronic device 101 of FIG. 1 or the electronic device 201 of FIG. 2) may display at least one content sub-element (e.g., in the illustrated example, List A, List B, and List C) of the selected content element in the second content window 1567 of the plurality of content windows. Upon identifying selection of content sub-element 1565b (List A) from among the content sub-elements displayed in the second content window 1567, the electronic device 1501 may display content corresponding to the selection of content sub-element 1565b in the second content window 1567, as shown in FIG. 15B.

Referring to FIG. 15B, the electronic device 1501 may display content corresponding to the selection of the content sub-element 1565b (List A), or to at least one content sub-sub-element included in the selected content sub-element 1565b, in the second content window 1567 of the plurality of content windows displayed on the display 1560.

FIGS. 16A to 16D are views 1600a, 1600b, 1600c, and 1600d illustrating operations of menu organization on a screen on a display in an electronic device according to various embodiments.

Figure 16A:
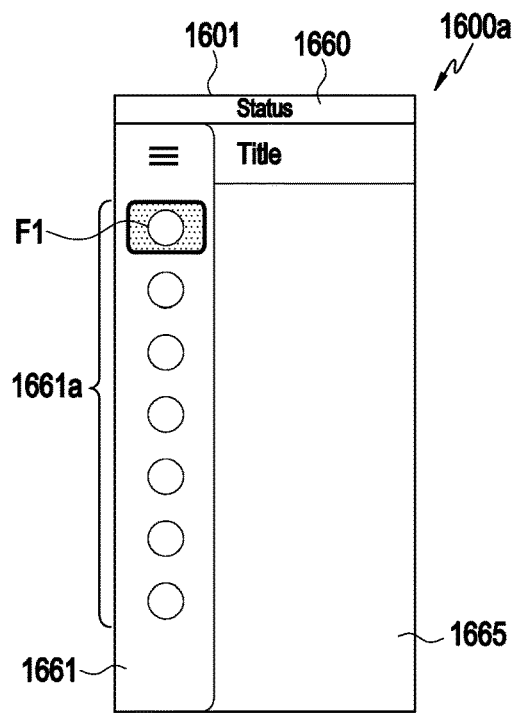
FIGS. 16A to 16D are views illustrating operations of menu organization on a screen on a display in an electronic device, according to various embodiments.

Referring to FIG. 16A, in the first state, the electronic device 1601 (e.g., the electronic device 101 of FIG. 1 or the electronic device 201 of FIG. 2) may display a focused (or selected) first menu F1 among at least one menu 1661a included in the basic menu window 1661 to be distinguished from non-focused menus. (The content window 1665 is also displayed in this example but will not be used in the described operations.)

Figure 16B:
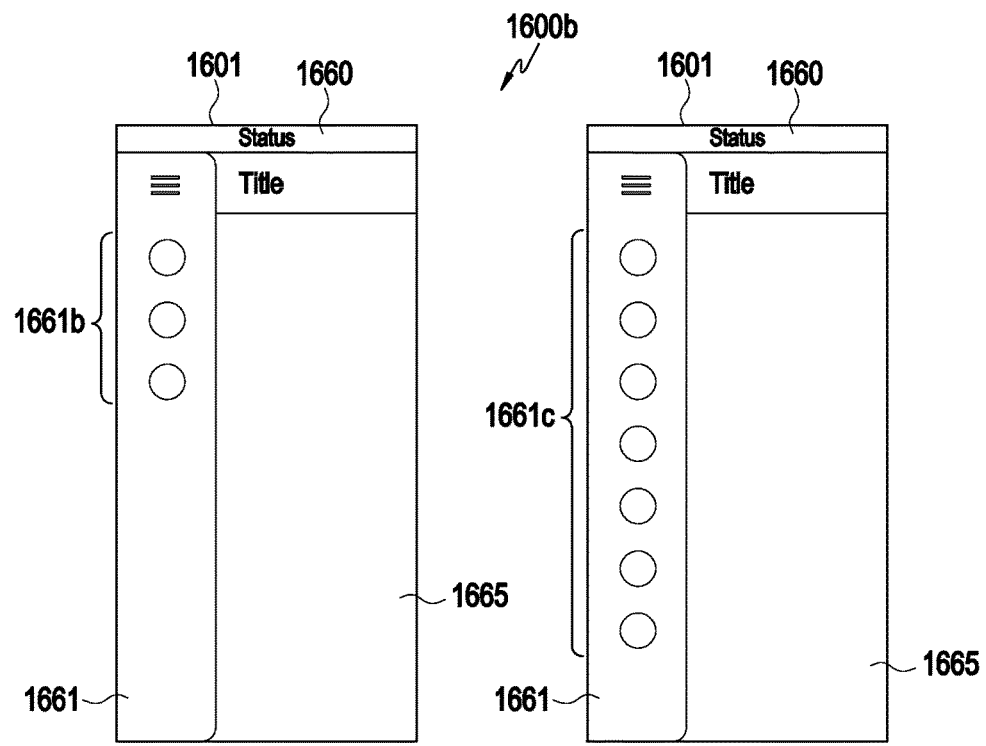

Referring to FIG. 16B, the electronic device 1601 may display at least three menus 1661b in the basic menu window 1661, as in the example (a) on the left, or display at least seven menus 1661c in the basic menu window 1661, as in the example (b) on the right, based on order of priority among the menus for performing the operation of the currently running application.

Figure 16C:
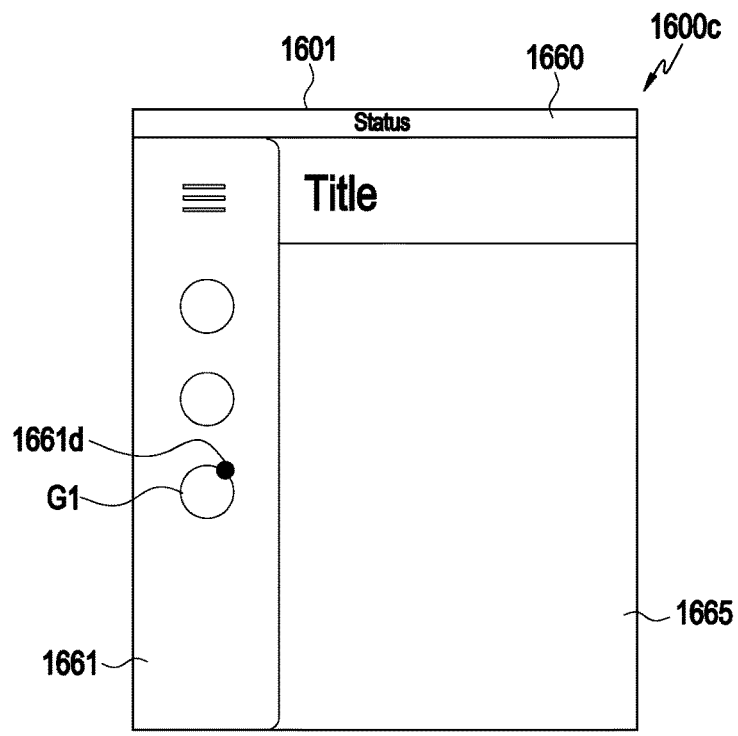

Referring to FIG. 16C, if a new menu G1 is added among the menus included in the basic menu window 1661, the electronic device 1601 may apply a visual indicator 1661d to the new menu G1 to indicate the addition of the new menu.

Figure 16D:
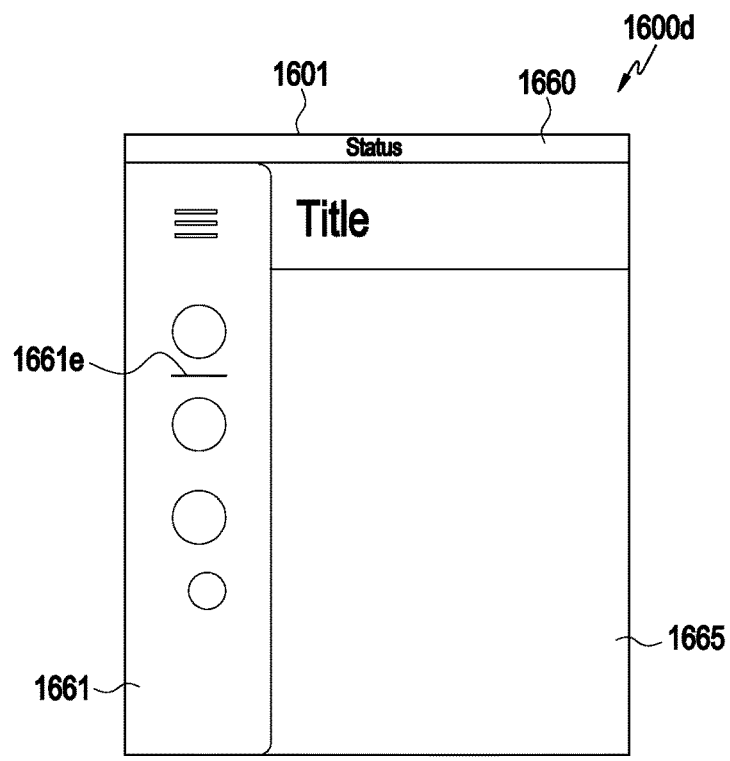

Referring to FIG. 16D, the electronic device 1601 may display the menus included in the basic menu window to be distinguished by category using a differentiator 1661e.

Figure 17A:
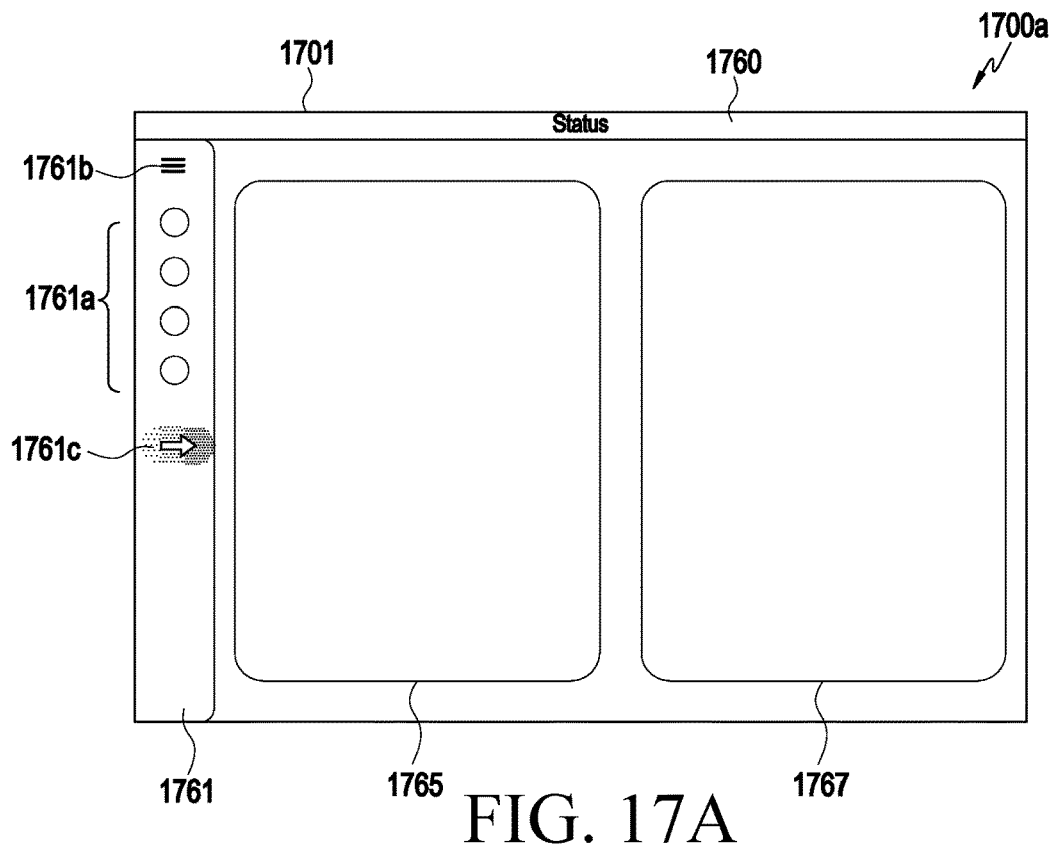
FIGS. 17A and 17B are views illustrating an operation of transitioning a screen of a display in a second state between a basic menu window and an extended menu window in an electronic device, namely a tablet PC, according to various embodiments.
Figure 17B:
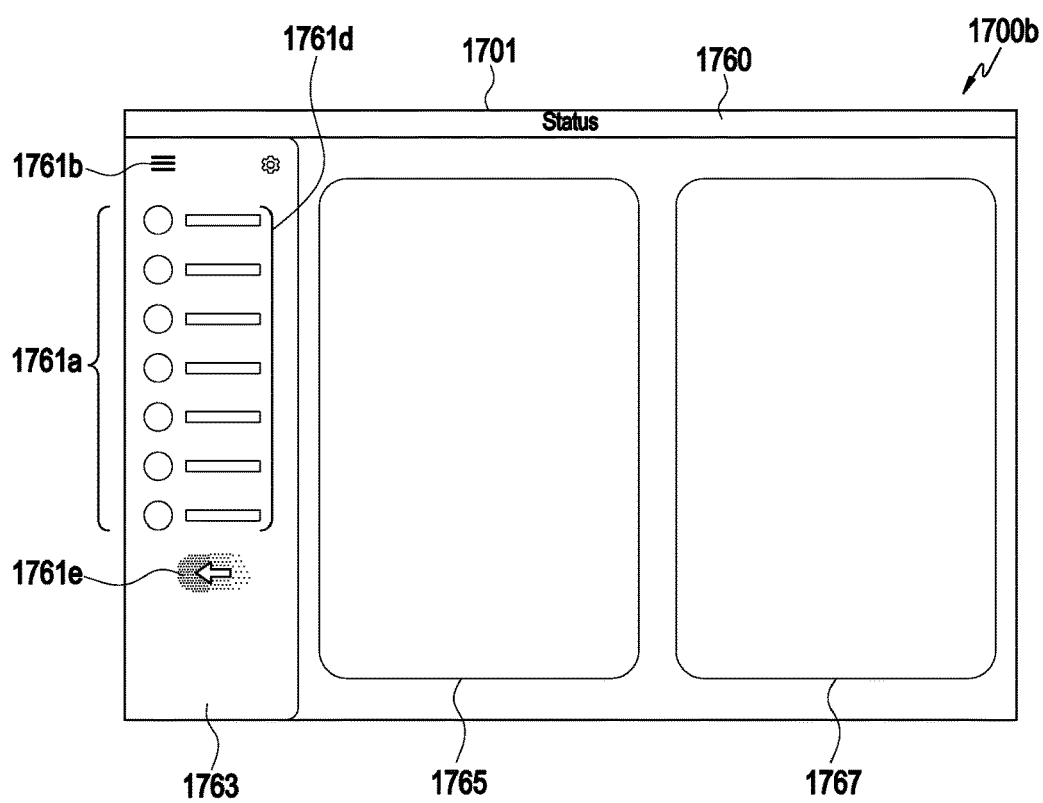

FIGS. 17A and 17B are views 1700a and 1700b illustrating an operation of transitioning a screen of a display in a second state between a basic menu window and an extended menu window in an electronic device, namely a tablet PC, according to various embodiments.

Referring to FIG. 17A, in the second state, upon detecting selection of an icon 1761b included in the basic menu window 1761 which is designated for displaying the extended menu window, or upon detecting a first gesture 1761c in the basic menu window 1761 which is designated for displaying the extended menu window 1763, the electronic device 1701 (e.g., a tablet PC, which may be configured according to the electronic device 101 of FIG. 1 or the electronic device 201 of FIG. 2) may switch to displaying the extended menu window 1763 on the display 1760, while continuing to display the plurality of content windows 1765 and 1767, as shown in FIG. 17B.

Referring to FIG. 17B, the electronic device 1701 may display, on the display 1760, the extended menu window 1763 within the area with the second size greater than the size of the basic menu window 1761, and may also display a plurality of content windows 1765 and 1767, within an area which has been resized based on the size of the extended menu window 1763. The electronic device 1701 may display at least one menu 1761a from the basic menu window 1761, and information 1761d about the menus, in the extended menu window 1763. An icon 1761b, which may be located in the extended menu window 1763 as illustrated in FIG. 17B, is designated for activating display of the basic menu window 1761. A second gesture 1761e (e.g., a second drag from the right to left in the extended menu window 1763) is designated for activating display of the basic menu window 1761. Upon detecting selection of the icon 1761b or upon detecting the second gesture 1761e while displaying the extended menu window 1763 and plurality of content windows 1765 and 1767, the electronic device 1701 may switch to displaying the basic menu window 1761 on the display 1760, while continuing to display the plurality of content windows 1765 and 1767, as shown in FIG. 17A.

Figure 18A:
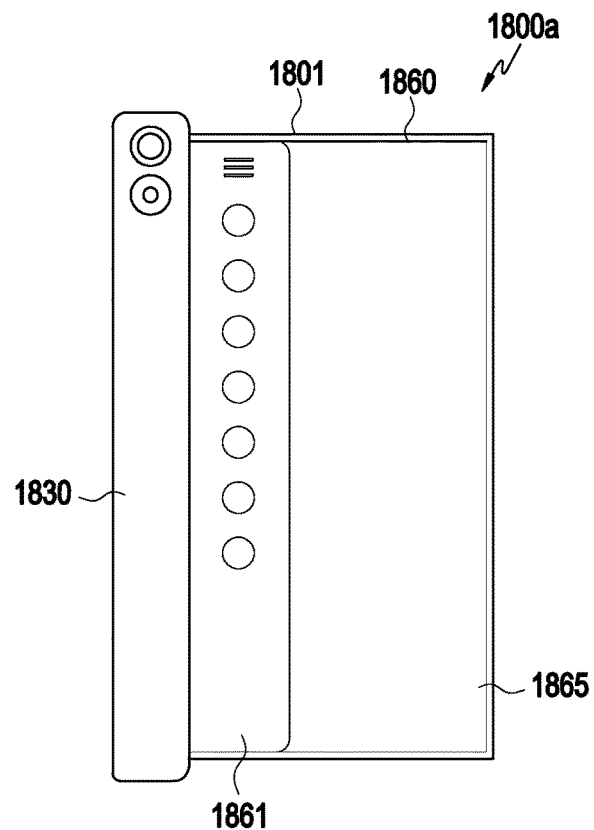
FIGS. 18A to 18C are views illustrating an operation of transitioning a screen of a rollable-type flexible display between display modes in an electronic device, according to various embodiments.
Figure 18B:
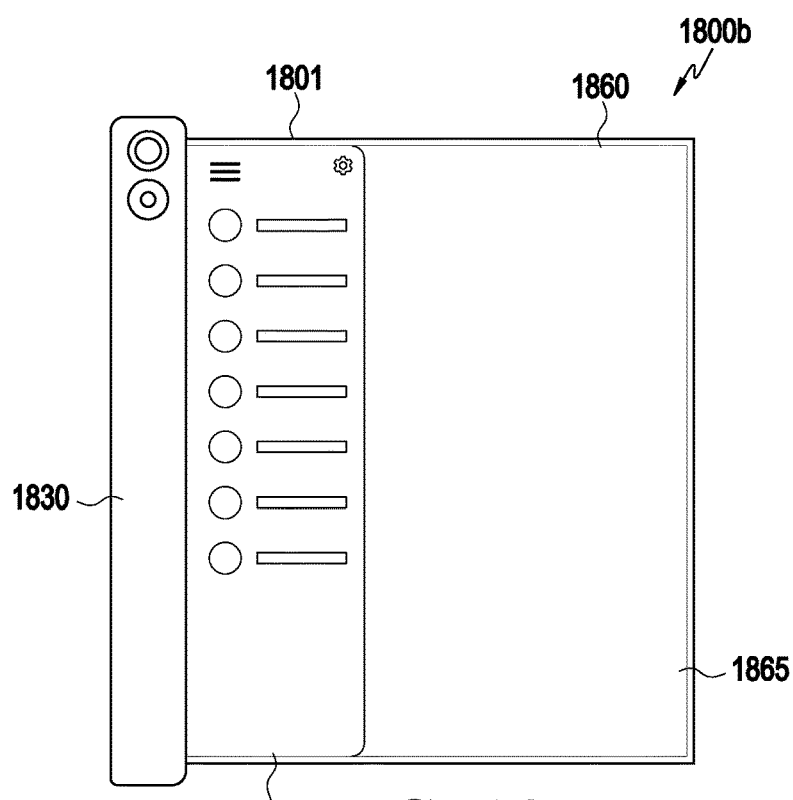
Figure 18C:
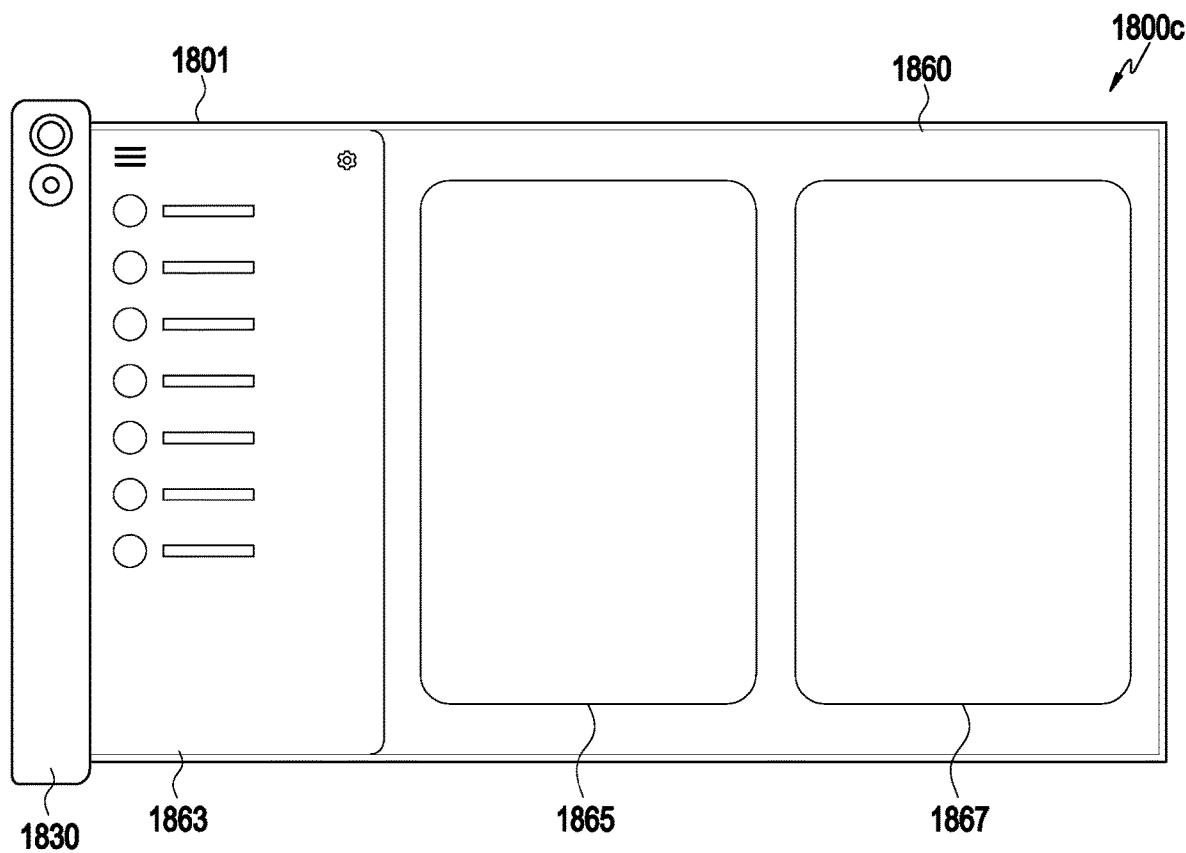

FIGS. 18A to 18C are views 1800*a*, 1800*b*, and 1800*c* illustrating an operation of transitioning a screen of a rollable-type flexible display between display modes in an electronic device, according to various embodiments.

Referring to FIGS. 18A to 18C, if the electronic device 1801 (e.g., the electronic device 101 of FIG. 1 or the electronic device 201 of FIG. 2) includes a rollable-type flexible display 1860, the electronic device 1801 may identify screen size information about the display 1860 according to how much of the display 1860 is contained in the housing 1830 of the electronic device and how much of the display 1860 is exposed outside the housing 1830.

Referring to FIG. 18A, if the display 1860 contained in the housing 1830 of the electronic device is partially exposed, and the exposed area of the display is a first exposed area, the electronic device 1801 may operate in the first state, and may display the basic menu window 1861 and the content window 1865 on the display 1860, based on the screen size information about the display corresponding to the first exposed area of the display.

Referring to FIG. 18B, if the display 1860 contained in the housing 1830 of the electronic device is partially exposed, and the exposed area of the display is a second exposed area which is further exposed than the first exposed area of FIG. 18A, the electronic device 1801 may remain in the first state and display a single content window 1865 on the display 1860, but may also display the extended menu window 1863 instead of the basic menu window 1861, based on the screen size information about the display corresponding to the second exposed area of the display.

Referring to FIG. 18C, if the display 1860 contained in the housing 1830 of the electronic device is exposed, and the exposed area of the display is a third exposed area which is further exposed than the second exposed area of FIG. 18B, the electronic device 1801 may switch into the second state of displaying the extended menu window 1863 and a plurality of content windows 1865 and 1867 on the display 1860, based on the screen size information about the display corresponding to the third exposed area of the display.

Figure 19A:
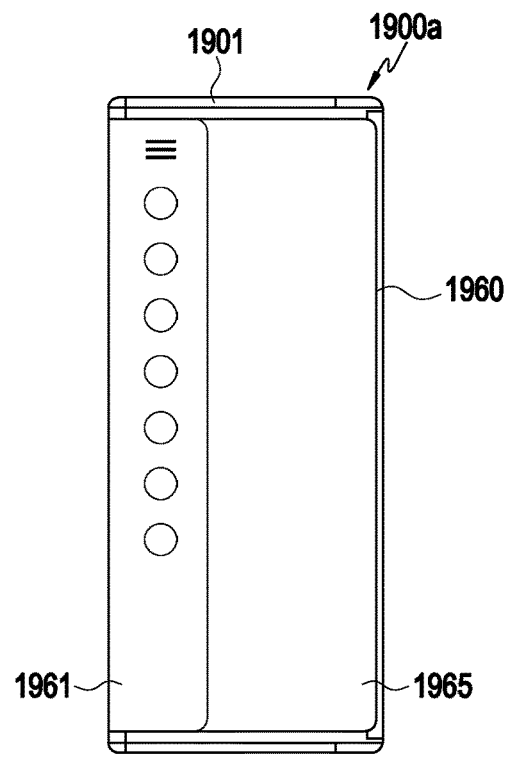
FIGS. 19A and 19B are views illustrating an operation of transitioning a screen of a flexible display between display modes in an electronic device, according to various embodiments.
Figure 19B:
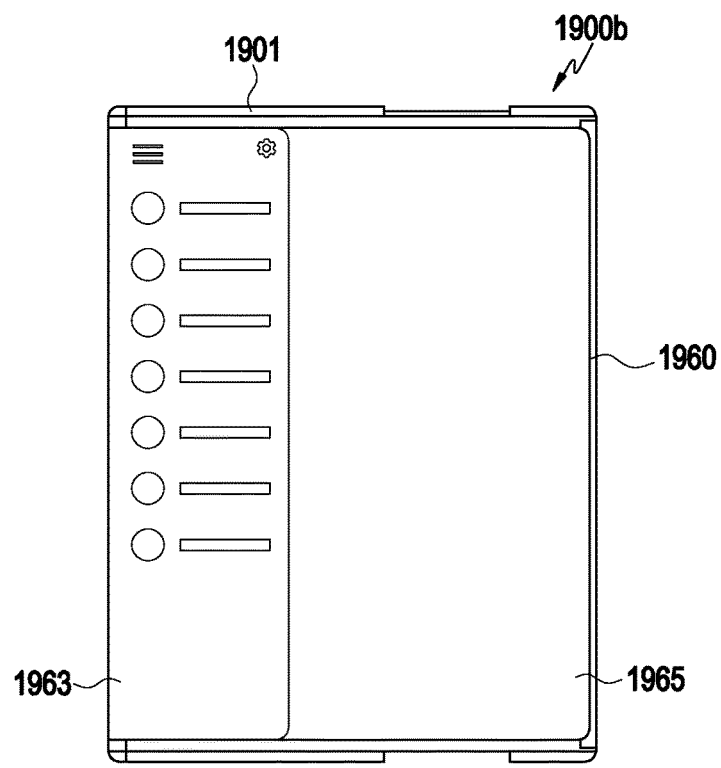

FIGS. 19A and 19B are views 1900*a* and 1900*b* illustrating an operation of transitioning a screen of a flexible display between display modes in an electronic device, according to various embodiments.

Referring to FIGS. 19A and 19B, if the electronic device 1901 (e.g., the electronic device 101 of FIG. 1 or the electronic device 201 of FIG. 2) includes a flexible display 1960, which includes a first area and a second area extending from the first area which can be either exposed or inserted into the housing of the electronic device, the electronic device 1901 may identify screen size information about the display according to how much of the display 1960 is inserted in the housing of the electronic device and how much of the display 1960 is exposed outside the housing.

Referring to FIG. 19A, if the second area of the display 1960 is partially exposed to the outside of the housing, and the exposed area of the second area of the display is a first exposed area, the electronic device 1901 may operate in the first state, and may display the basic menu window 1961 and the content window 1965 on the display 1960, based on the screen size information about the display corresponding to the first exposed area of the display.

Referring to FIG. 19B, if the second area of the display 1960 is exposed to the outside of the housing, and the exposed area of the second area of the display is a second exposed area which is further exposed than the first exposed area of FIG. 19A, the electronic device 1901 may remain in the first state and display a single content window 1965 on the display 1960, but may also display the extended menu window 1963 instead of the basic menu window 1961, based on the screen size information about the display corresponding to the second exposed area of the display.

Figure 20A:
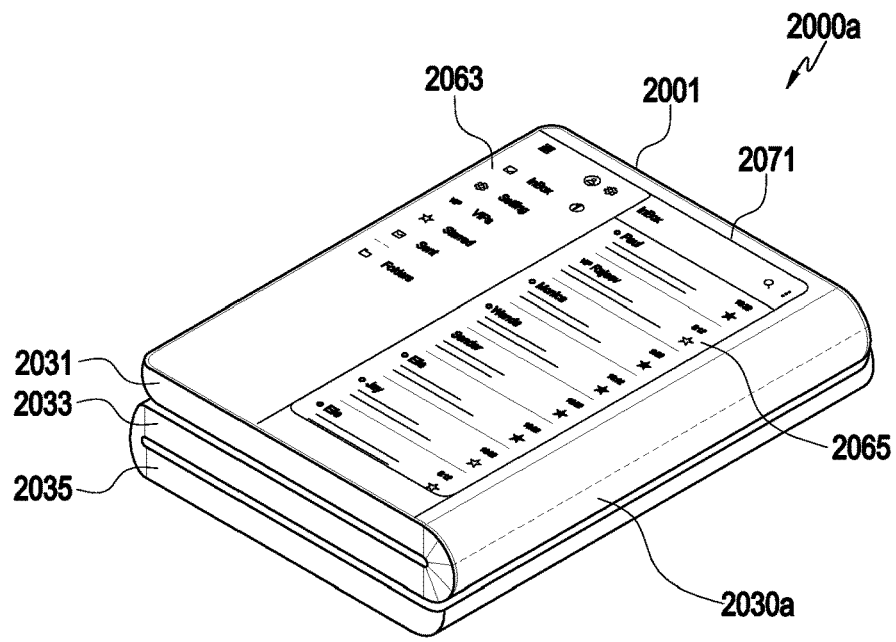
FIGS. 20A and 20B are views illustrating an operation of transitioning a screen of a foldable display between display modes in an electronic device, according to various embodiments.
Figure 20B:
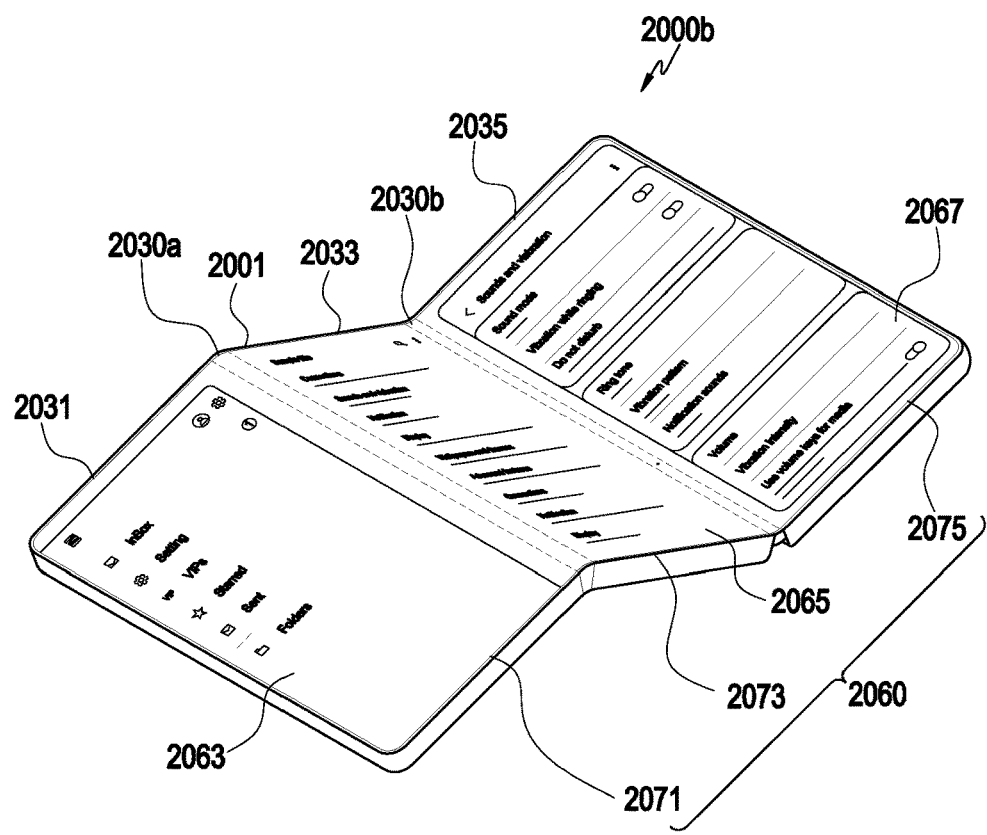

FIGS. 20A and 20B are views 2000*a* and 2000*b* illustrating an operation of transitioning a screen of a foldable display between display modes in an electronic device, according to various embodiments.

Referring to FIGS. 20A and 20B, if a first housing 2031 and a second housing 2033 are connected through an out-folding hinge 2030*a*, the second housing 2033 and a third housing 2035 are connected through an in-folding hinge 2030*b*, and an electronic device 2001 (e.g., the electronic device 101 of FIG. 1 or the electronic device 201 of FIG. 2) includes a flexible display 2060 including a first area 2071 disposed on the first housing 2031, a second area 2073 disposed on the second housing 2033, and a third area 2075 disposed on the third housing 2035, the electronic device 1901 may identify screen size information about the display based on exposure of the display according to a folding of the hinge.

Referring to FIG. 20A, upon detecting exposure only of the first area 2071 of the display 2060 according to a folding on the out-folding hinge 2030*a* connecting the first housing 2031 and the second housing 2033, and according to a folding on the in-folding hinge 2030*b* connecting the second housing 2033 and the third housing 2035, the electronic device 2001 may display an extended menu window 2063 and a content window 2065 in the first area 2071 of the display 2060, based on the screen size information about the display corresponding to the first area 2071 of the display 2060.

Referring to FIG. 20B, upon detecting exposure of the first area 2071, the second area 2073, and the third area 2075 of the display 2060 according to an unfolding on the out-folding hinge 2030*a* connecting the first housing 2031 and the second housing 2033, and according to an unfolding on the in-folding hinge 2030*b* connecting the second housing 2033 and the third housing 2035, the electronic device 2001 may display the extended menu window 2063 in the first area 2071 of the display 2060, display the first content window 2065 of the plurality of content windows in the second area 2073 of the display 2060, and display the second content window 2067 of the plurality of content windows in the third area 2075 of the display 2060, based on the screen size information about the display corresponding to the first area 2071, the second area 2073 and the third area 2075 of the display 2060.

Figure 21:
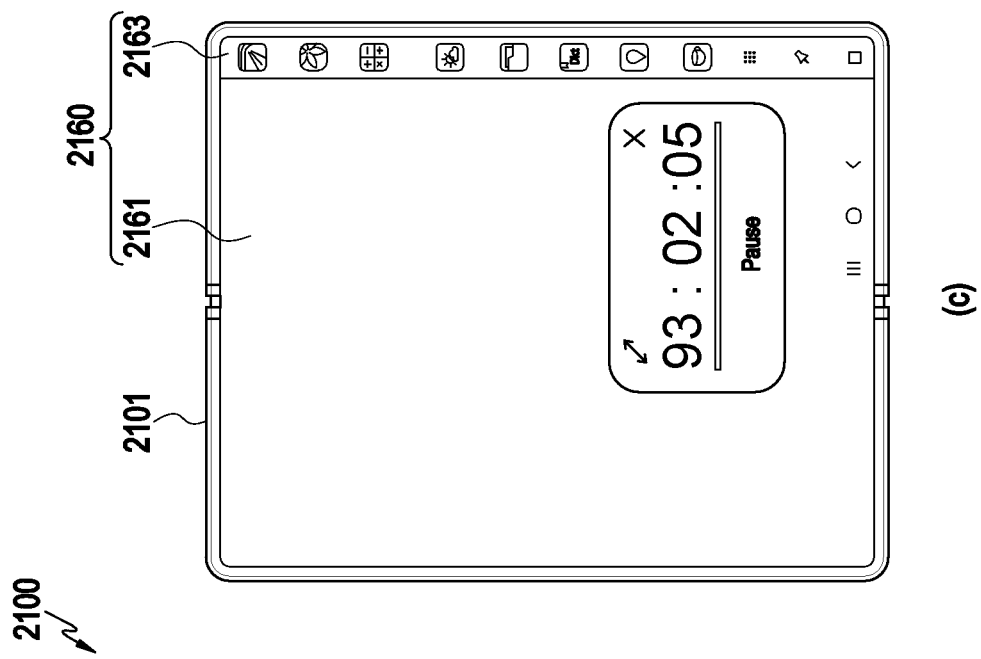
FIG. 21 is a view illustrating an operation of preserving a fixed area on a screen of a foldable display in an electronic device, according to various embodiments.
Figure 21:
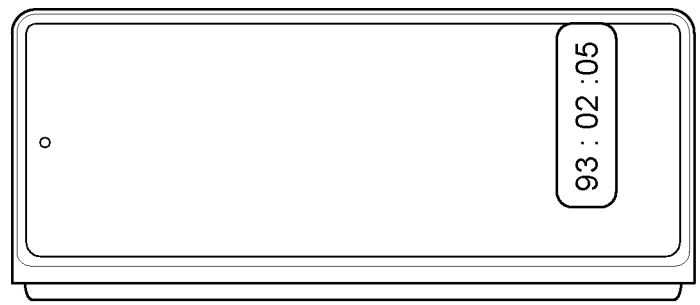
Figure 21:
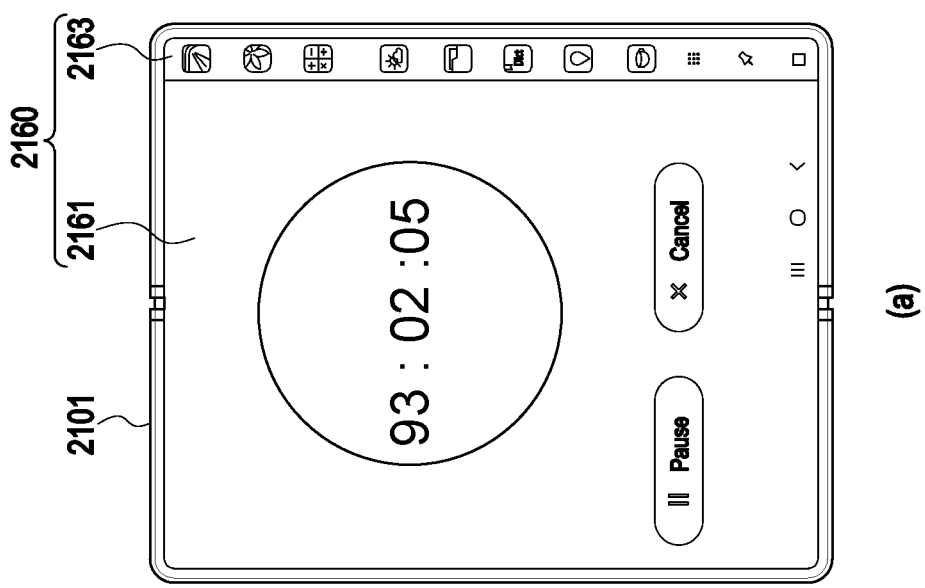

FIG. 21 is a view 2100 illustrating an operation of preserving a fixed area on a screen of a foldable display in an electronic device, according to various embodiments.

Referring to FIG. 21, in the example (a) on the left, an electronic device 2101 (e.g., the electronic device 101 of FIG. 1 or the electronic device 201 of FIG. 2) is unfolded, and a first application is being executed in a first area 2161 of the display 2160. Upon identifying selection for execution of a second application (e.g., in the illustrated example, an edge menu window) fixed and displayed in a second area 2163 (e.g., in the illustrated example, the right area) of the display 2160 while still displaying the execution of the first application in the first area 2161 of the display 2160, the electronic device 2101 may resize the first area 2161 and the display of the execution of the first application, so as not to overlap the second area 2163 or the display of the execution of the second application. The electronic device 2101 may further resize the first area 2161 so that the first area 2161 of the display 2160 does not overlap the second (fixed) area 2163 of the display 2160 when the electronic device 2101 switches from the hinge-unfolded state as shown in example (a) to the hinge-folded state as shown in example (b), then back to the hinge-unfolded state as shown in example (c).

Figure 22:
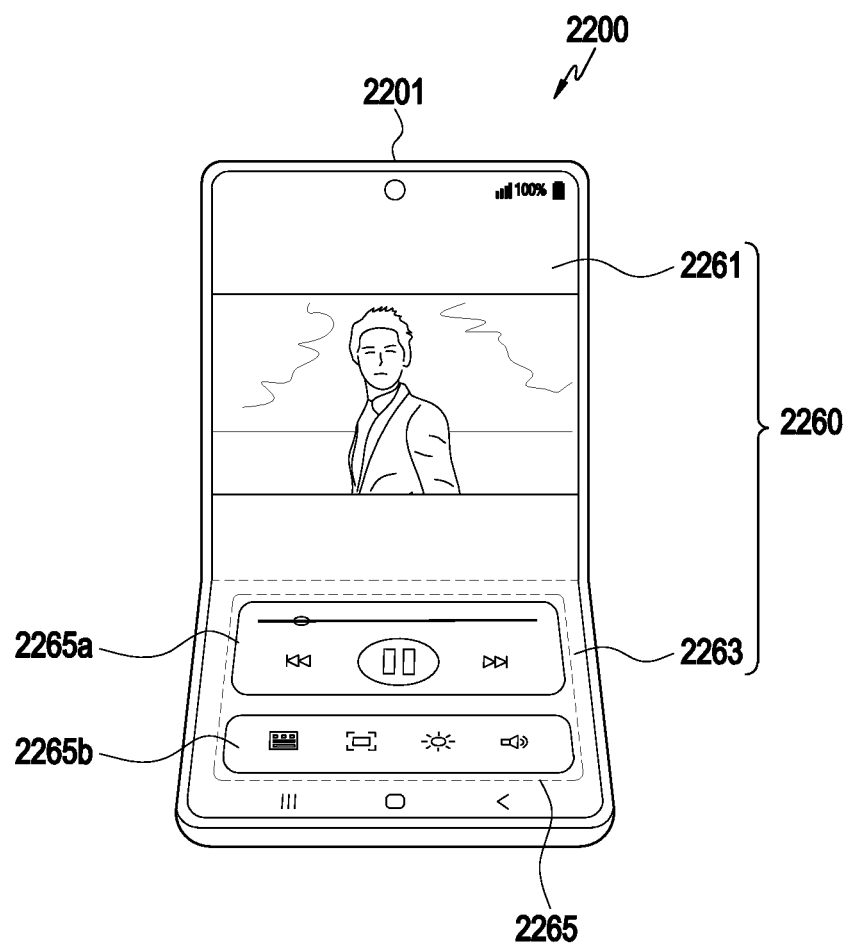
FIG. 22 is a view illustrating an operation of arranging applications and application controls on a screen of a foldable display in an electronic device, according to various embodiments.

FIG. 22 is a view 2200 illustrating an operation of arranging applications and application controls on a screen of a foldable display in an electronic device, according to various embodiments.

Referring to FIG. 22, the electronic device 2201 (e.g., the electronic device 101 of FIG. 1 or the electronic device 201 of FIG. 2) may divide the display 2260 into a first area 2261, positioned on the upper side, and a second area 2263, positioned on the lower side, based on sensor information received from the sensor module (e.g., the sensor module 267 of FIG. 2) capable of detecting a folding on the hinge connecting at least two housings included in the electronic device 2201. Upon identifying execution of an application which is a particular type of application (e.g., a media session-related application) in the first area 2261, the electronic device 2201 may display, in the second area 2263, a panel 2265 including at least one control button for controlling the application running in the first area and at least one system button for controlling the system of the electronic device. The electronic device 2101 may display, in a first section 2265a of the panel 2265, at least one control button (e.g., a video play button, play/stop button, and next video play button) for controlling an application (e.g., a video application) running in the first area 2261, and display, in a second section 2265b of the panel 2265, at least one system button (e.g., a notification button, screen capture button, display brightness adjustment button, or volume adjustment button) for controlling the system of the electronic device.

According to various embodiments, an electronic device (e.g., the electronic device 201 of FIG. 2) may comprise a flexible display (e.g., the display 260 of FIG. 2) may comprise a flexible display (e.g., the display 260 of FIG. 2), and a processor (e.g., the processor 220 of FIG. 2) configured to identify screen size information about the flexible display, control the flexible display to operate the flexible display in a first state of displaying an activated menu window and an activated content window, based on the screen size information indicating a first screen size of the flexible display, and control the flexible display to operate the flexible display in a second state of displaying the activated menu window and a plurality of activated content windows, based on the screen size information indicating a second screen size of the flexible display.

According to various embodiments, the processor may be further configured to identify the screen size information about the display based on detecting a change in a screen size of the display.

According to various embodiments, the processor may be further configured to, based on identifying a display setting of the activated menu window for the first state as a basic menu window, control the flexible display to display the basic menu window in an area having a first size, and display the activated content window having a size based on the first size of the area of the basic menu window.

According to various embodiments, the processor may be further configured to, based on identifying selection of display of an extended menu window while displaying the basic menu window in the first state, control the flexible display to display the extended menu window in an area having a second size larger than the first size of the area of the basic menu window, and display the activated content window resized based on a size of the extended menu window.

According to various embodiments, the processor may be further configured to, based on identifying a display setting of the activated menu window for the first state as an extended menu window, control the flexible display to display the extended menu window in an area having a second size larger than a first size of an area of a basic menu window, and display the activated content window having a size based on the second size of the area of the extended menu window.

According to various embodiments, the processor may be further configured to, based on identifying a display setting of the activated menu window for the second state as a basic menu window, control the flexible display to display the basic menu window in an area having a first size, and display the plurality of activated content windows each having a size based on the first size of the area of the basic menu window.

According to various embodiments, the processor may be further configured to, based on identifying selection of display of an extended menu window while displaying the basic menu window in the second state, control the flexible display to display the extended menu window in an area having a second size larger than the first size of the area of the basic menu window, and display the plurality of activated content windows each resized based on the second size of the area of the extended menu window.

According to various embodiments, the processor may be configured to, based on identifying a display setting of the activated menu window for the second state as an extended menu window, control the flexible display to display the extended menu window within an area having a second size larger than a first size of an area of a basic menu window, and control the display to display the plurality of activated content windows each having a size based on the second size of the area of the extended menu window.

According to various embodiments, the processor may be further configured to control the flexible display to move a content selected by a user from among at least one content displayed in the activated content window to the activated menu window, in at least one of the first state or the second state.

According to various embodiments, the processor may be further configured to, based on identifying selection of a first content from among at least one content included in a first content window among the plurality of activated content windows, control the flexible display to display at least one sub content included in the selected first content in a second content window among the plurality of activated content windows, in the second state.

Figure 23:
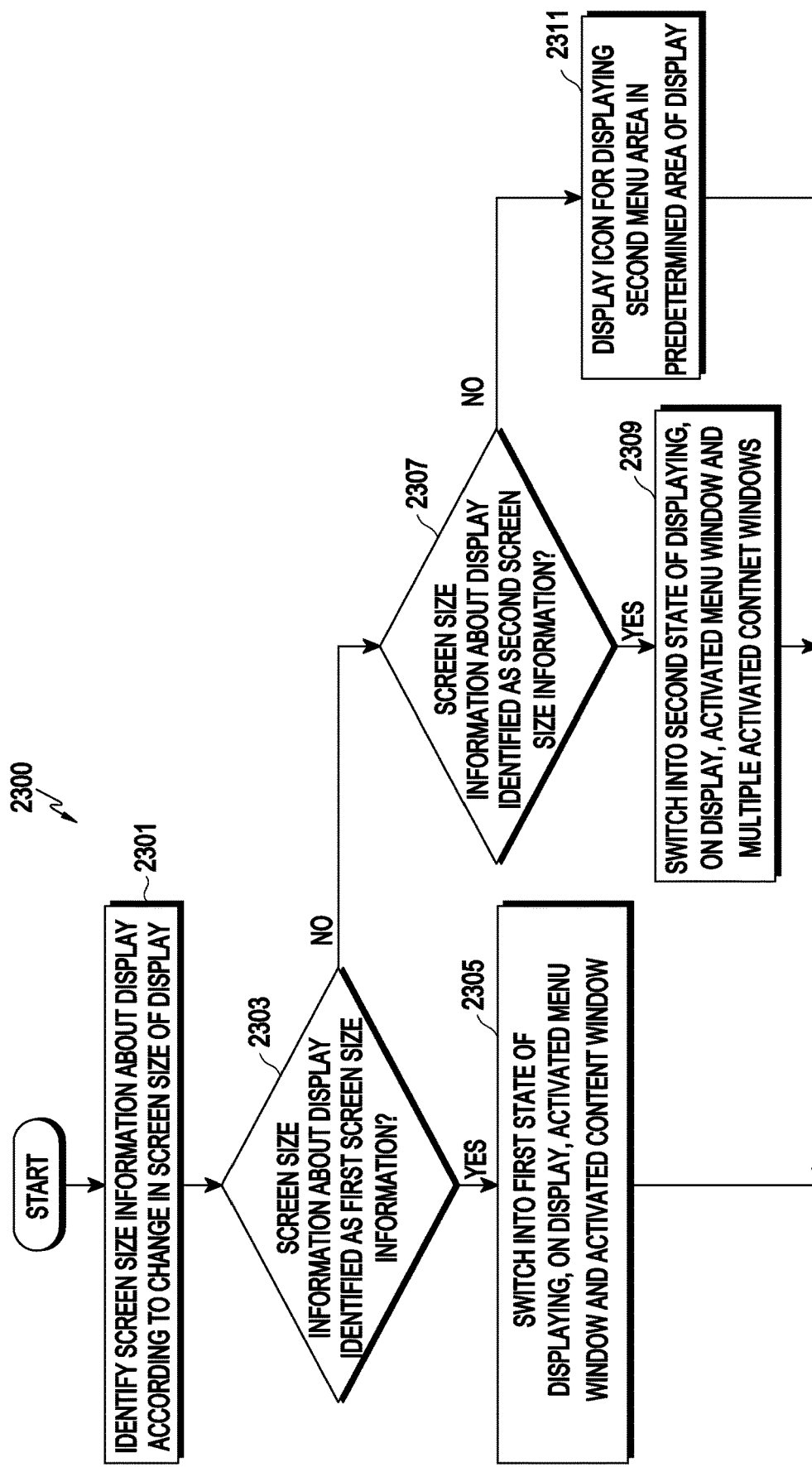
FIG. 23 is a flowchart illustrating an operation of configuring a screen of a display in an electronic device, according to various embodiments.

FIG. 23 is a flowchart 2300 illustrating an operation of configuring a screen of a display in an electronic device, according to various embodiments. The operations may include operations 2301 to 2311. According to an embodiment, at least one of operations 2301 to 2311 may be omitted or changed in order or may add other operations. The operations may be performed by the electronic device 101 of FIG. 1, the processor 120 of FIG. 1, the electronic device 201 of FIG. 2, or the processor 220 of FIG. 2.

In operation 2301, the electronic device 201 may identify screen size information about the display according to a change in the screen of the display.

According to an embodiment, the electronic device 201 may identify the screen size information about the display using sensor information received from the sensor module (e.g., the sensor module 276 of FIG. 2) capable of detecting a change in the screen size of the display (e.g., the display 260 of FIG. 2).

According to an embodiment, the electronic device 201 may identify the screen size information for the display in the landscape mode of the electronic device or the portrait mode of the electronic device, using sensor information from the sensor module (e.g., the sensor module 276 of FIG. 2) capable of detecting the rotation of the electronic device. Other means by which the screen size information for the display may be altered, and identified as having been altered, have been previously discussed.

In operation 2303, the electronic device 201 may identify whether the screen size information (e.g., width information or height information about the display) about the display (e.g., the display 260 of FIG. 2) is first screen size information.

According to an embodiment, the electronic device 201 may identify whether the display screen size information includes the first screen size information, e.g., indicating a size measurement between 600 dp and 959 dp.

Upon identifying that the display screen size information includes the first screen size information in operation 2303, the electronic device 201 may switch into the first state of displaying the activated menu window and the activated content window on the display in operation 2305.

According to an embodiment, upon identifying a display setting of the menu window (e.g., a set default state of the menu window) for the first state as the basic menu window, the electronic device 201 may display the basic menu window within the area having the first size on the display, and display the content window in the area not overlapping the basic menu window. Upon identifying selection of display of the extended menu window while displaying the basic menu window and the content window, the electronic device 201 may display the extended menu window within the area with the second size larger than the basic menu window, and the content window shrunken to fit within an area not overlapping the extended menu window based on the size of the extended menu window. As the electronic device 201 reduces the size of the content displayed in the content window to correspond to the resizing of the content window, it is possible to display all content in the content window. Upon detecting selection of an icon for displaying the extended menu window, included in the basic menu window or a first gesture (e.g., a first drag from the left to right) for displaying the extended menu window, the electronic device 201 may identify it as selection of display of the extended menu window.

According to an embodiment, upon identifying a display setting of the menu window (e.g., a set default state of the menu window) for the first state as the extended menu window, the electronic device 201 may display the extended menu window and the content window on the display, display the extended menu window within the area with the second size larger than the basic menu window on the display, and display the content window within an area not overlapping the extended menu window. Upon identifying selection of display of the basic menu window while displaying the extended menu window and the content window, the electronic device 201 may display the basic menu window within the area with the first size smaller than the extended menu window, and the content window enlarged to fill the area not overlapping the basic menu window based on the size of the basic menu window. As the electronic device 201 increases the size of the content displayed in the content window to correspond to the resizing of the content window, it is possible to display all content elements in the content window. Upon detecting selection of an icon for displaying the basic menu window, included in the extended menu window or a second gesture (e.g., a second drag from the right to left) for displaying the basic menu window, the electronic device 201 may identify it as selection of display of the basic menu window.

Upon identifying that the screen size information about the display (e.g., the display of FIG. 2) does not include the first screen size information in operation 2303, the electronic device 201 may identify whether the screen size information (e.g., width information or height information about the display) about the display is second screen size information in operation 2307.

According to an embodiment, the electronic device 201 may identify whether the display screen size information includes the second screen size information, e.g., indicating a screen size of 960 dp or more.

Upon identifying that the display screen size information includes the second screen size information in operation 2307, the electronic device 201 may switch into the second state of displaying the activated plurality of menu windows and the activated content window on the display in operation 2309.

According to an embodiment, upon identifying a display setting of the menu window (e.g., a set default state of the menu window) for the second state as the basic menu window, the electronic device 201 may display the basic menu window and the plurality of content windows on the display. More specifically, the electronic device 201 may display the basic menu window within the area with the first size on the display, and display the plurality of content windows within an area not overlapping the basic menu window. Upon identifying selection of display of the extended menu window while displaying the basic menu window and the plurality of content windows, the electronic device 201 may display the extended menu window within the area with the second size larger than the basic menu window and the plurality of content windows, shrunken to fit within an area not overlapping the extended menu window based on the size of the extended menu window. As the electronic device 201 reduces the size of the content displayed in each of the plurality of content windows to correspond to the resizing of the plurality of content windows, it is possible to display all content in each of the plurality of content windows. Upon detecting selection of an icon for displaying the extended menu window, included in the basic menu window or a first gesture (e.g., a first drag from the left to right) for displaying the extended menu window, the electronic device 201 may identify it as selection of display of the extended menu window.

According to an embodiment, upon identifying a display setting of the menu window (e.g., a set default state of the menu window) for the second state as the extended menu window, the electronic device 201 may display the extended menu window and the plurality of content windows on the display, display the extended menu window within the area with the second size enlarged as compared with the basic menu window on the display, and display the plurality of content windows, as an area not overlapping the extended menu window. Upon identifying selection of display of the basic menu window while displaying the extended menu window and the plurality of content windows, the electronic device 201 may display the basic menu window within the area with the first size reduced as compared with the extended menu window and the plurality of content windows enlarged to the area not overlapping the basic menu window based on the size of the basic menu window. As the electronic device 201 increases the size of the content displayed in each of the plurality of content windows to correspond to the resizing of the plurality of content windows, it is possible to display all content in each of the plurality of content windows. Upon detecting selection of an icon for displaying the basic menu window, included in the extended menu window or a second gesture (e.g., a second drag from the right to left) for displaying the basic menu window, the electronic device 201 may identify it as selection of display of the basic menu window.

Upon identifying that the screen size information (e.g., width information or height information about the display) about the display (e.g., the display 260 of FIG. 2) does not include the second screen size information in operation 2307, the electronic device 201 may display an icon for displaying the extended menu window in a predetermined area of the display in operation 2311.

According to an embodiment, upon identifying the screen size information about the display as screen size information smaller than the first screen size information (e.g., indicating a screen size of 600 dp or less), the electronic device 201 may display an icon for displaying the extended menu window in a predetermined area (e.g., an upper area) of the display and, upon identifying selection of the icon, display the activated extended menu window and the inactivated content window on the display 260.

Figure 24:
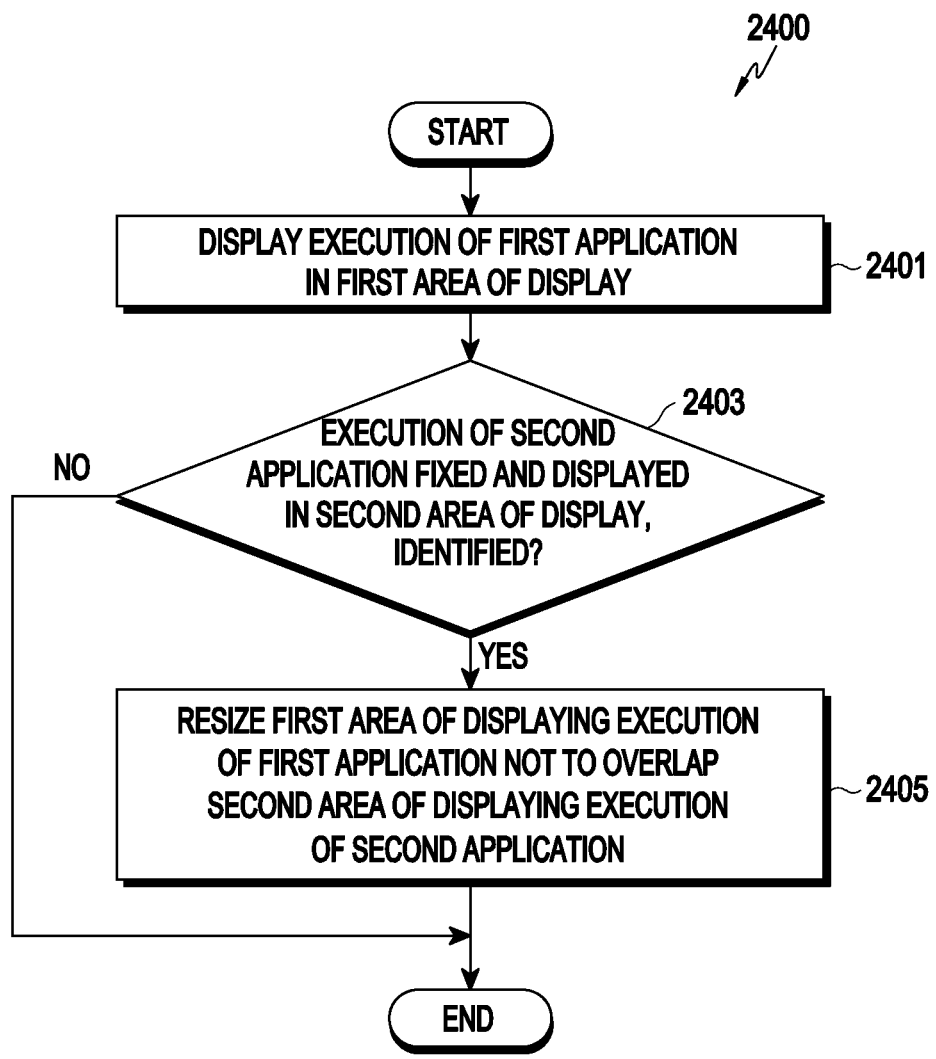
FIG. 24 is a flowchart illustrating an operation of arranging applications on a screen of a display in an electronic device, according to various embodiments.

FIG. 24 is a flowchart 2400 illustrating an operation of arranging applications on a screen of a display in an electronic device, according to various embodiments. The operations may include operations 2401 to 2405. According to an embodiment, at least one of operations 2401 to 2405 may be omitted or changed in order or may add other operations. The operations may be performed by the electronic device 101 of FIG. 1, the processor 120 of FIG. 1, the electronic device 201 of FIG. 2, or the processor 220 of FIG. 2.

In operation 2401, the electronic device 201 may display the execution of a first application in a first area of the display (e.g., the display 260 of FIG. 2).

In operation 2403, the electronic device 201 may identify whether a second application, which is fixed for display in the second area of the display 260, is executed.

Upon identifying the execution of the second application in operation 2403, the electronic device 201 may resize the first area displaying the execution of the first application so as not to overlap the second area, in operation 2405.

Figure 25:
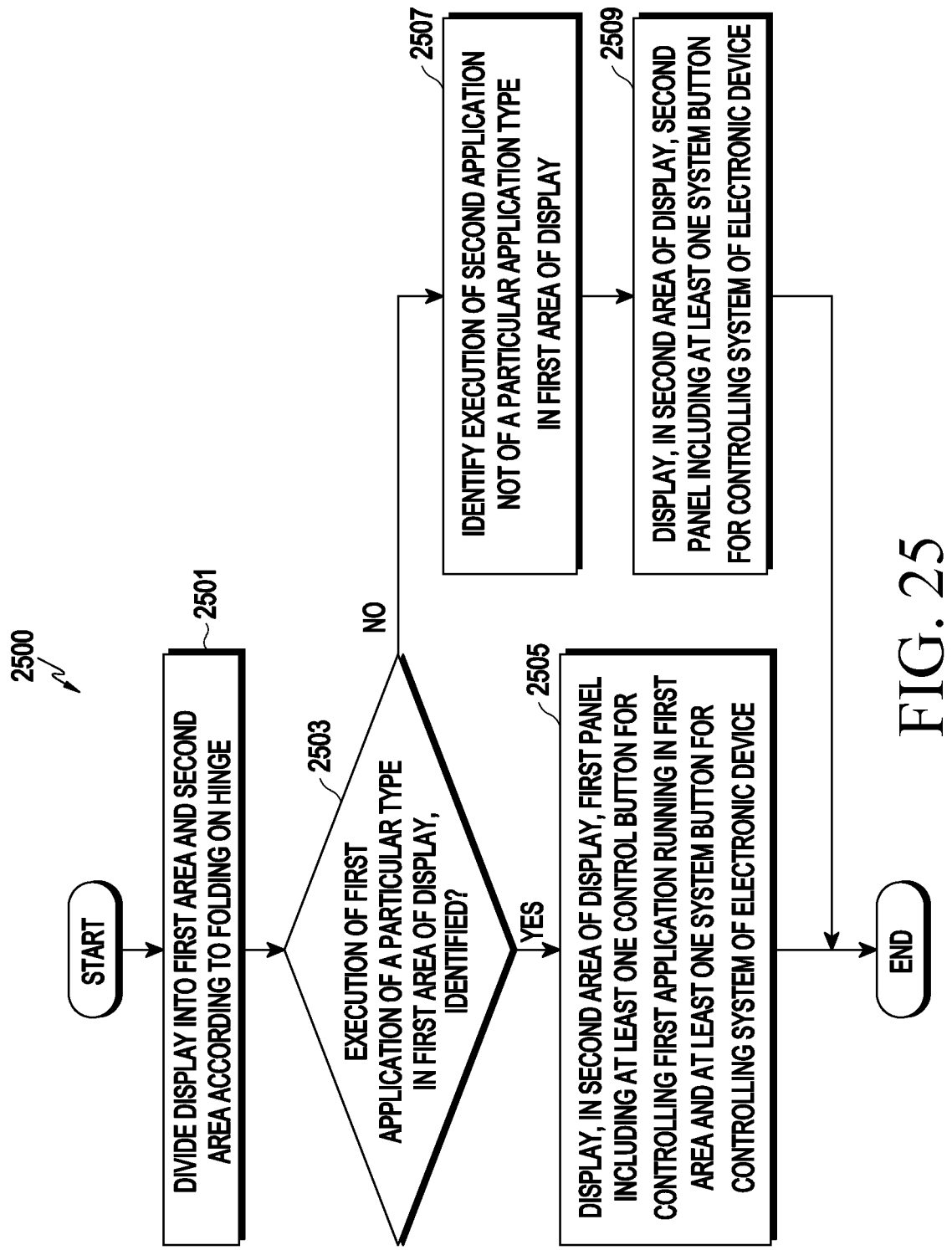
FIG. 25 is a flowchart illustrating an operation of arranging applications and application controls on a screen of a foldable display in an electronic device, according to various embodiments.

FIG. 25 is a flowchart 2500 illustrating an operation of arranging applications and application controls on a screen of a foldable display in an electronic device, according to various embodiments. The operations may include operations 2501 to 2509. According to an embodiment, at least one of operations 2501 to 2509 may be omitted or changed in order or may add other operations. The operations may be performed by the electronic device 101 of FIG. 1, the processor 120 of FIG. 1, the electronic device 201 of FIG. 2, or the processor 220 of FIG. 2.

In operation 2501, the electronic device 201 may divide the display (e.g., the display 260 of FIG. 2) into a first area and a second area according to a folding on the hinge.

According to an embodiment, the electronic device 201 may divide the display into the first area, positioned on the upper side, and the second area, positioned on the lower side, based on sensor information received from the sensor module (e.g., the sensor module, 267) capable of detecting a folding on the hinge connecting two housings included in the electronic device.

In operation 2503, the electronic device 201 may identify whether a first application of a particular type (e.g., a media session-related application) is executed in the first area of the display.

Upon identifying execution of the first application of the particular application type in the first area of the display in operation 2503, the electronic device 201 may display, in the second area of the display, a first panel including at least one control button (e.g., a video play button, a play/stop button, and a next video play button) for controlling the first application running in the first area and at least one system button (e.g., a notification button, a screen capture button, a display brightness adjustment button, and a volume adjustment button) for controlling the system of the electronic device, in operation 2505.

Upon failing to identify the execution of the application of the particular application type in the first area of the display in operation 2503, the electronic device 201 may identify execution of a second application not of the particular application type (e.g., not a media session-related application) in the first area of the display in operation 2507.

In operation 2509, the electronic device 201 may display a second panel including at least one system button (e.g., a notification button, a screen capture button, a display brightness adjustment button, and a volume adjustment button) for controlling the system of the electronic device in the second area of the display.

According to various embodiments, a method for configuring a screen of a flexible display of an electronic device may comprise identifying screen size information about the flexible display; operating the flexible display in a first state of displaying an activated menu window and an activated content window on the display, based on the screen size information indicating a first screen size of the flexible display, and operating the flexible display in a second state of displaying the activated menu window and a plurality of activated content windows on the display, based on the screen size information indicating a second screen size of the flexible display.

According to various embodiments, the identifying the screen size information may include identifying the screen size information based on detecting a change in a screen size of the flexible display.

According to various embodiments, the method may further include, based on identifying a display setting of the activated menu window for the first state as a basic menu window, displaying, on the flexible display, the basic menu window within an area having a first size, and the activated content window having a size based on the first size of the area of the basic menu window.

According to various embodiments, the method may further include, based on identifying selection of display of an extended menu window while displaying the basic menu window in the first state, displaying, on the flexible display, the extended menu window within an area having a second size larger than the first size of the area of the basic menu window, and the activated content window resized based on a size of the extended menu window.

According to various embodiments, the method may further include, based on identifying a display setting of the activated menu window for the first state as an extended menu window, displaying, on the flexible display, the extended menu window within an area having a second size larger than a first size of an area of a basic menu window, and the activated content window having a size based on the second size of the area of the extended menu window.

According to various embodiments, the method may further include, based on identifying a display setting of the activated menu window for the second state as a basic menu window, displaying, on the flexible display, the basic menu window within an area having a first size, and the plurality of activated content windows each having a size based on the first size of the area of the basic menu window.

According to various embodiments, the method may further include, based on identifying selection of display of an extended menu window while displaying the basic menu window in the second state, displaying, on the flexible display, the extended menu window within an area having a second size larger than the first size of the area of the basic menu window, and the plurality of activated content windows each resized based on the second size of the area of the extended menu window.

According to various embodiments, the method may further include, based on identifying a display setting of the activated menu window for the second state as an extended menu window, displaying, on the flexible display, the extended menu window within an area having a second size larger than a first size of an area of a basic menu window, and the plurality of activated content windows each having a size based on the second size of the area of the extended menu window.

According to various embodiments, the method may further include moving a content selected by a user from among at least one content displayed in the activated content window to the activated menu window, in at least one of the first state and the second state.

According to various embodiments, the method may further include, based on identifying selection of a first content from among at least one content included in a first content window among a plurality of content windows, displaying at least one sub content included in the first content in a second content window among the plurality of activated content windows, in the second state.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a flexible display;
memory storing instructions; and
a processor,
wherein the instructions, when executed by the processor, cause the electronic device to:
identify screen size information about the flexible display,
identify a display setting of a basic menu window or a display setting of an extended menu window larger than the basic menu window,
display the basic menu window on the flexible display, and display an activated content window on a first area of the flexible display which is not overlapped with the basic menu window, based on the display setting of the basic menu window and the screen size information indicating a first screen size of the flexible display,
display the extended menu window on a continuous area of the flexible display, and display the activated content window on a second area of the flexible display which is not overlapped with the extended menu window, based on the display setting of the extended menu window and the screen size information indicating the first screen size of the flexible display,
display the basic menu window on the flexible display, and display a plurality of activated content windows on a third area of the flexible display which is not overlapped with the basic menu window, based on the display setting of the basic menu window and the screen size information indicating a second screen size of the flexible display larger than the first screen size, and
display the extended menu window on a continuous area of the flexible display, and display the plurality of activated content windows on a fourth area of the flexible display which is not overlapped with the extended menu window, based on the display setting of the extended menu window and the screen size information indicating the second screen size of the flexible display,
wherein the basic menu window comprises a plurality of icons, and the extended menu window comprises the plurality of icons with additional information adjacent to each icon among the plurality of icons,
wherein each piece of the additional information corresponds to an icon that is adjacent to the piece of the additional information,
wherein the basic menu window includes a first icon for displaying the extended menu window and the extended menu window includes a second icon for displaying the basic menu window, and
wherein the basic menu window is displayed when an input with respect to the second icon is received on the extended menu window and the extended menu window is displayed when an input with respect to the first icon is received on the basic menu window.

2. The electronic device of claim 1, further comprising a sensor,
wherein the instructions, when executed by the processor, cause the electronic device to identify the screen size information about the display based on detecting a change associated with a folding or a rolling of the flexible display by the sensor.

3. The electronic device of claim 1, wherein the instructions, when executed by the processor, cause the electronic device to, based on identifying selection of display of the extended menu window while displaying the basic menu window in a first state, display the extended menu window larger than the basic menu window, and display the activated content window resized based on a size of the extended menu window.

4. The electronic device of claim 1, wherein the instructions, when executed by the processor, cause the electronic device to, based on identifying selection of display of the extended menu window while displaying the basic menu window in a second state, display the extended menu window larger than the basic menu window, and display the plurality of activated content windows each resized based on an area of the extended menu window.

5. The electronic device of claim 1, wherein the instructions, when executed by the processor, cause the electronic device to control the flexible display to move a content selected by a user from among at least one content displayed in the activated content window to an activated menu window, in at least one of a first state or a second state.

6. The electronic device of claim 1, wherein the instructions, when executed by the processor, cause the electronic device to, based on identifying selection of a first content from among at least one content included in a first content window among the plurality of activated content windows, display at least one sub content included in the first content in a second content window among the plurality of activated content windows, in a second state.

7. A method for configuring a screen of a flexible display of an electronic device, the method comprising:
identifying screen size information about the flexible display;
identifying a display setting of a basic menu window or a display setting of an extended menu window larger than the basic menu window;
displaying the basic menu window on the flexible display, and displaying an activated content window on a first area of the flexible display which is not overlapped with the basic menu window, based on the display setting of the basic menu window and the screen size information indicating a first screen size of the flexible display;
displaying the extended menu window on a continuous area of the flexible display, and displaying the activated content window on a second area of the flexible display which is not overlapped with the extended menu window, based on the display setting of the extended menu window and the screen size information indicating the first screen size of the flexible display;
displaying the basic menu window on the flexible display, and displaying a plurality of activated content windows on a third area of the flexible display which is not overlapped with the basic menu window, based on the display setting of the basic menu window and the screen size information indicating a second screen size of the flexible display larger than the first screen size; and
displaying the extended menu window on a continuous area of the flexible display, and displaying the plurality of activated content windows on a fourth area of the flexible display which is not overlapped with the extended menu window, based on the display setting of the extended menu window and the screen size information indicating the second screen size of the flexible display, wherein the basic menu window comprises a plurality of icons, and the extended menu window comprises the plurality of icons with additional information adjacent to each icon among the plurality of icons, wherein each piece of the additional information corresponds to an icon that is adjacent to the piece of the additional information, wherein the basic menu window includes a first icon for displaying the extended menu window and the extended menu window includes a second icon for displaying the basic menu window, and wherein the basic menu window is displayed when an input with respect to the second icon is received on the extended menu window and the extended menu window is displayed when an input with respect to the first icon is received on the basic menu window.

8. The method of claim 7, wherein the identifying the screen size information comprises identifying the screen size information based on detecting a change associated with a folding or a rolling of the flexible display by a sensor.

9. The method of claim 7, further comprising, based on identifying selection of display of the extended menu window while displaying the basic menu window in a first state, displaying, on the flexible display, the extended menu window within larger than the basic menu window, and the activated content window resized based on a size of the extended menu window.

10. The method of claim 7, further comprising, based on identifying selection of display of the extended menu window while displaying the basic menu window in a second state, displaying, on the flexible display, the extended menu window larger than the basic menu window, and the plurality of activated content windows each resized based on an area of the extended menu window.

11. The method of claim 7, further comprising moving a content selected by a user from among at least one content displayed in the activated content window to an activated menu window, in at least one of a first state or a second state.

12. The method of claim 7, further comprising, based on identifying selection of a first content from among at least one content included in a first content window among the plurality of activated content windows, displaying at least one sub content included in the first content in a second content window among the plurality of activated content windows, in a second state.

* * * * *